United States Patent
Darling et al.

(10) Patent No.: US 10,528,573 B1
(45) Date of Patent: Jan. 7, 2020

(54) DISCOVERING KEYWORDS IN SOCIAL MEDIA CONTENT

(71) Applicant: Tomorrowish LLC, Natick, MA (US)

(72) Inventors: Richard Michael Darling, Natick, MA (US); Todd Dibble, North Grafton, MA (US); Tristan Dix Amzallag, Saratoga Springs, NY (US); Cameron Guerra Betts, Berlin, MA (US); Phillip Dreizen, Kew Gardens, NY (US); Dan Afonso, Leominster, MA (US)

(73) Assignee: Tomorrowish LLC, Framingham, MA (US)

( * ) Notice: Subject to any disclaimer, the term of this patent is extended or adjusted under 35 U.S.C. 154(b) by 471 days.

(21) Appl. No.: 15/099,135

(22) Filed: Apr. 14, 2016

Related U.S. Application Data

(60) Provisional application No. 62/147,147, filed on Apr. 14, 2015.

(51) Int. Cl.
  *G06F 16/2457* (2019.01)
  *G06Q 50/00* (2012.01)
(52) U.S. Cl.
  CPC ....... *G06F 16/24578* (2019.01); *G06Q 50/01* (2013.01)
(58) Field of Classification Search
  None
  See application file for complete search history.

(56) References Cited

U.S. PATENT DOCUMENTS

| | | |
|---|---|---|
| 7,657,905 B2 | 2/2010 | Kimoto |
| 8,561,106 B1 | 10/2013 | Taylor et al. |
| 9,306,989 B1 | 4/2016 | Jayaram |
| 9,357,242 B2 | 5/2016 | Sinha |
| 9,544,650 B1 * | 1/2017 | Oztaskent .......... H04N 21/4394 |

(Continued)

FOREIGN PATENT DOCUMENTS

WO  WO 2014/144225  9/2014

OTHER PUBLICATIONS

International Search Report and Written Opinion, PCT/US2014/28540, dated Sep. 19, 2014, 12 pages.

(Continued)

*Primary Examiner* — Christopher J Raab
(74) *Attorney, Agent, or Firm* — Fish & Richardson P.C.; Frank L. Gerratana

(57) ABSTRACT

In one aspect, a computer-implemented method includes, at a social media playback system comprising one or more computer processors and in communication with a data communications network, receiving data representing social media content from at least one social media service in communication with the communications network, the social media content comprising elements of social media, receiving, from a media provider in communication with the communications network, schedule data pertaining to a first media program, calculating, based at least in part on the schedule data, a relevance score for a first keyword identified in the social media content, the relevance score indicative of the relevance of the first keyword to the first media program, determining that the relevance score calculated for the first keyword satisfies a relevance score threshold, and storing data associating the first keyword and the first media program.

19 Claims, 26 Drawing Sheets

(56) References Cited

U.S. PATENT DOCUMENTS

| | | |
|---|---|---|
| 2004/0049498 A1 | 3/2004 | Dehlinger |
| 2005/0060745 A1 | 3/2005 | Riedl et al. |
| 2007/0157237 A1 | 7/2007 | Cordray |
| 2008/0066100 A1 | 3/2008 | Brodersen et al. |
| 2008/0083003 A1 | 4/2008 | Biniak et al. |
| 2008/0088735 A1 | 4/2008 | Biniak et al. |
| 2008/0235727 A1 | 9/2008 | Seong |
| 2009/0132527 A1 | 5/2009 | Sheshagiri et al. |
| 2010/0058417 A1 | 3/2010 | Rondeau et al. |
| 2011/0063503 A1 | 3/2011 | Brand et al. |
| 2011/0137845 A1 | 6/2011 | Ward |
| 2011/0178854 A1 | 7/2011 | Sofer |
| 2011/0179062 A1 | 7/2011 | Lee et al. |
| 2011/0238673 A1 | 9/2011 | Carter |
| 2012/0203706 A1 | 8/2012 | Teran |
| 2012/0215773 A1 | 8/2012 | Si et al. |
| 2012/0226678 A1* | 9/2012 | Park ................. G06Q 10/10 707/709 |
| 2012/0227073 A1 | 9/2012 | Hosein |
| 2012/0254152 A1* | 10/2012 | Park ................. G06Q 30/02 707/710 |
| 2012/0331496 A1 | 12/2012 | Copertino et al. |
| 2013/0036169 A1* | 2/2013 | Quigley ............. G06Q 10/00 709/204 |
| 2013/0091117 A1* | 4/2013 | Minh ............... G06F 17/30864 707/709 |
| 2013/0091204 A1 | 4/2013 | Loh |
| 2013/0103667 A1* | 4/2013 | Minh ............... G06F 17/30864 707/709 |
| 2013/0170819 A1 | 7/2013 | Dykeman |
| 2013/0290859 A1 | 10/2013 | Venkitaraman et al. |
| 2013/0297581 A1* | 11/2013 | Ghosh ............. G06F 17/30864 707/706 |
| 2014/0140679 A1 | 5/2014 | Khader et al. |
| 2014/0181197 A1 | 6/2014 | Baggott |
| 2014/0189540 A1 | 7/2014 | Pead |
| 2014/0201240 A1* | 7/2014 | Andavarapu ..... G06F 17/30023 707/771 |
| 2014/0229487 A1* | 8/2014 | Mukund ........... G06F 17/30035 707/740 |
| 2014/0280564 A1 | 9/2014 | Darling et al. |
| 2015/0106360 A1* | 4/2015 | Cao ................... G06F 17/30716 707/723 |
| 2015/0143405 A1* | 5/2015 | Hogan .............. H04N 21/8146 725/32 |
| 2015/0227579 A1* | 8/2015 | Cantarero ......... G06F 17/30616 707/708 |
| 2017/0140398 A1* | 5/2017 | Fleischman ........ G06Q 30/0201 |

OTHER PUBLICATIONS

International Preliminary Report on Patentability in International Application No. PCT/US2014/028540, dated Sep. 24, 2015, 7 pages.

* cited by examiner

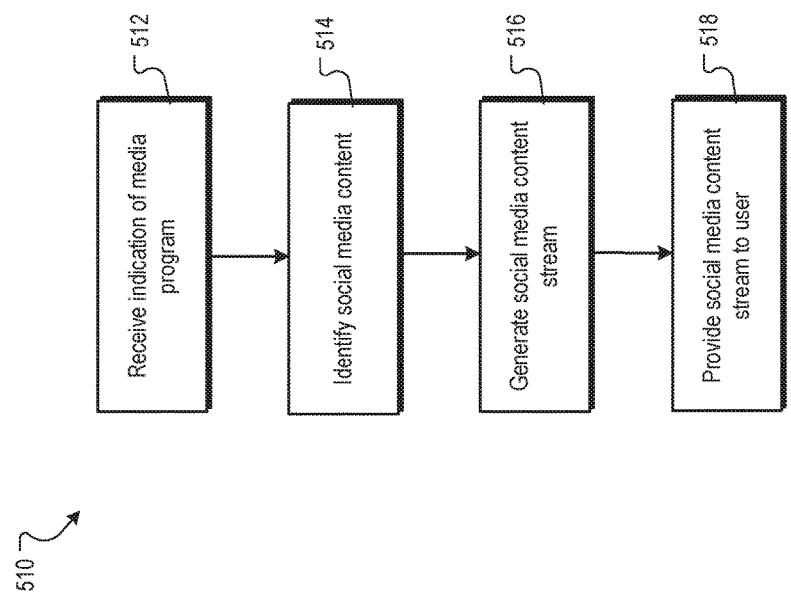

DISCOVERING KEYWORDS IN SOCIAL MEDIA CONTENT

FIELD OF TECHNOLOGY

This description relates to processing data received over a communications network for the purpose of discovering keywords in social media content.

BACKGROUND

Communications networks enable users of social media services to published authored social media content and receive social media content. Social media content is content authored by (or otherwise provided by) users of the social media services and designated to be provided to one or more other users of the social media services. Sometimes the content can be transmitted to users as soon as it is received by a social media service, e.g., in real time. Sometimes the content can be stored and later transmitted to users, a technique sometimes called "playing back" the content. The content may include one or more words of text.

SUMMARY

In one aspect, a computer-implemented method includes, at a social media playback system comprising one or more computer processors and in communication with a data communications network, receiving data representing social media content from at least one social media service in communication with the communications network, the social media content comprising elements of social media, receiving, from a media provider in communication with the communications network, schedule data pertaining to a first media program, calculating, based at least in part on the schedule data, a relevance score for a first keyword identified in the social media content, the relevance score indicative of the relevance of the first keyword to the first media program, determining that the relevance score calculated for the first keyword satisfies a relevance score threshold, and storing data associating the first keyword and the first media program.

In another aspect, a computer-implemented method includes, at a social media playback system comprising one or more computer processors and in communication with a data communications network, receiving data representing social media content from at least one social media service in communication with the communications network, the social media content comprising elements of social media, receiving, from one or more media providers in communication with the communications network, first schedule data pertaining to a first media program and second schedule data pertaining to a second media program, determining that a first keyword appears in a first element of the received social media content, the first element of the received social media content having been posted during a playback of the first media program and during a playback of the second media program, determining that the first keyword appears in a second element of the received social media content, the second element of the received social media content having been posted during a playback of the first media program and not during a playback of the second media program, calculating, based at least in part on the schedule data pertaining to the first media program and on information related to the first media program, a first relevance score for the first keyword identified in the social media content, the relevance score indicative of the relevance of the first keyword to the first media program, calculating, based at least in part on the schedule data pertaining to the second media program and on information related to the second media program, a second relevance score for the first keyword, determining that the first relevance score calculated for the first keyword satisfies a relevance score threshold, determining that the second relevance score calculated for the first keyword does not satisfy the relevance score threshold, and storing data associating the first keyword and the first media program.

In yet another aspect, at least one computer-readable storage medium encoded with executable instructions that, when executed by at least one processor, cause the at least one processor to perform operations including, receiving, at a social media playback system comprising one or more computer processors and in communication with a data communications network, social media content from at least one social media service in communication with the communications network, the social media content comprising elements of social media, receiving, from one or more media providers in communication with the communications network and at the social media playback system, schedule data pertaining to a first media program, calculating, by the social media playback system and based at least in part on the schedule data, a relevance score for a first keyword identified in the social media content, the relevance score indicative of the relevance of the first keyword to the first media program, determining, by the social media playback system, that the relevance score calculated for the first keyword satisfies a relevance score threshold, and storing, at the social media playback system, data associating the first keyword and the first media program.

These and other aspects, features, and implementations, and combinations of them, may be expressed as apparatus, methods, means or steps for performing functions, components, systems, program products, and in other ways.

Other aspects, features, and advantages will be apparent from the description and the claims.

DESCRIPTION OF FIGURES

FIGS. 5A, 5B, 5C, and 5D show flowcharts.
FIGS. 6 through 23 show user interfaces.

DETAILED DESCRIPTION

Figure 1:
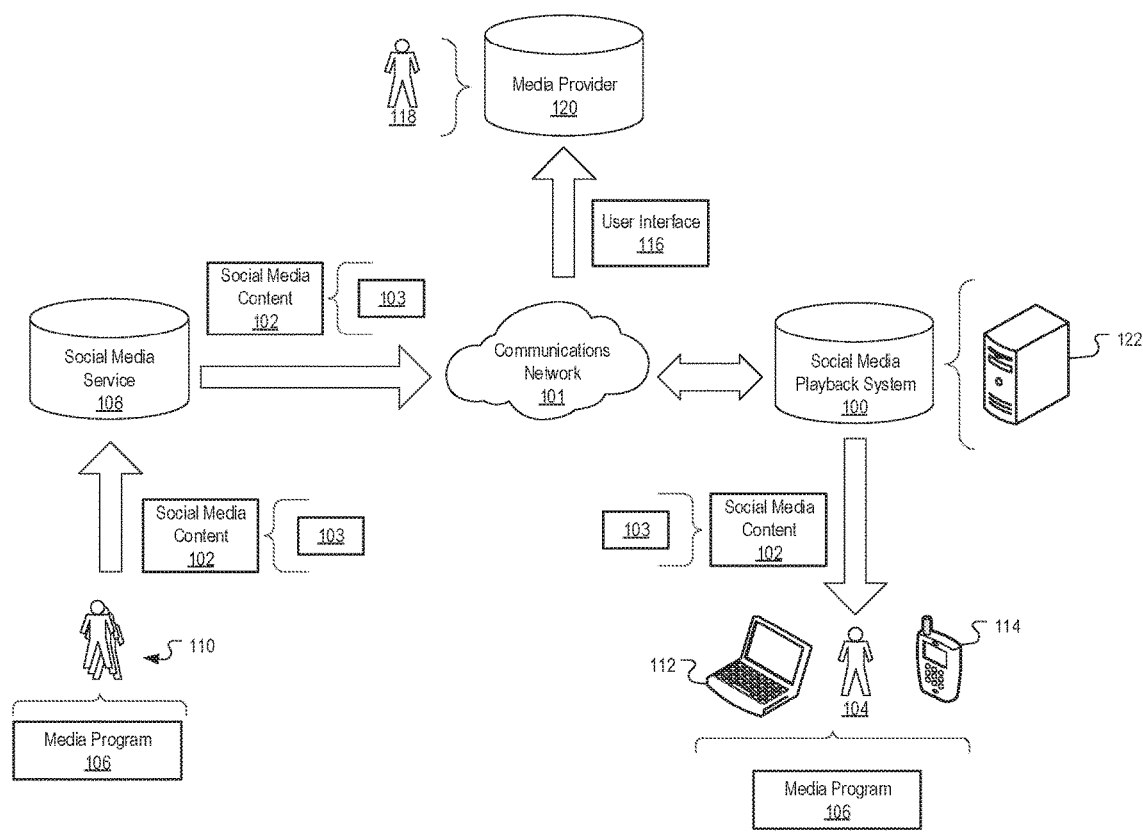
FIGS. 1 through 3 show a social media playback system.

A social media playback system provides social media content to a user who is experiencing a media program. The media program could be, for example, a film, episode of a television show, sporting event, news broadcast, or any other kind of media program. The social media content could be, for example, a social media stream containing content from social media services such as Twitter, Facebook, or any other social media service. The social media playback system makes inferences about what to display to the user. Such an inference is whether or not a short social media message like a tweet should be displayed in social media stream that the social media playback system displays when the user is experiencing a media program.

The social media playback system can identify keywords that are associated with particular types of media content and store associations between the keywords and media content in a database. These associations are used by the social media playback system to display "relevant" elements of social media content to the user experiencing media content during the initial broadcast of the media program or during a later playback of the media program, such as a recording of the media program. "Relevant" elements are those elements that include content that is semantically connected to a topic of the media program. For example, if the media program is an episode of a television program, an element of social media content in which the author of the content is discussing a topic of the media program, e.g., the characters, plot, or events of the media program, is relevant to the media program. In some examples, certain keywords may be associated with certain media programs like television shows. Sometimes the keywords are "hashtags" used in a short message social media system like Twitter, but the keywords could be any kind of text and need not be identified as hashtags. As an example, a person tweeting about the television show "Breaking Bad" might use a hashtag #breakingbad, or use the term "Breaking Bad" in a tweet describing an episode of the show.

The keywords can be determined in part based on schedule information available to the social media playback system. For example, social media content posted during a scheduled episode of a television show may be relevant to that television show in that elements of the social media content contain words that refer to the television show. For example, words that appear in at least a certain percentage, e.g., 60 percent, of elements in such content are more likely to be relevant to the television show. If one of these elements of social media content already contains other keywords known to be relevant to the television show then this increases the likelihood that other words in the element of social media content are also relevant to the television show. If a word in a tweet is a spelling variation of, is part of, or contains another word that is known to be a keyword, this increases the likelihood that the word is also a keyword relevant to the television show.

For example, if several tweets are made during a scheduled airing of "Breaking Bad" and those tweets contain the hashtag "#heisenberg" then that hashtag may be relevant to "Breaking Bad." If some of those tweets also contain a hashtag already known to be relevant to the show, e.g., the hashtag "#breakingbad" then there is a higher likelihood that "#heisenberg" is relevant to the show. The system can assign "#heisenberg" to its list of keywords relevant to "Breaking Bad" if the evidence passes a threshold, as explained further below with respect to FIG. 2.

The system can also identify terms that are ambiguous. For example, some tweets that appear during broadcasts of "Breaking Bad" may contain the hashtag "#chemistrydiscovery," and "chemistry" may be a keyword already associated with "Breaking Bad." These two factors indicate that "#chemistrydiscovery" is likely a keyword relevant to "Breaking Bad." However, the system may further identify that "#chemistrydiscovery" sometimes appears in tweets made at times other than at times in which "Breaking Bad" airs, and typically appears during episodes of PBS's "Nova." With this information, the system can determine that "#chemistrydiscovery" is likely a keyword relevant to "Nova," and less likely to be relevant to "Breaking Bad." In contrast, the keyword "#chemistry" may be relevant to both television shows if the term appears in tweets made during times at which either show is airing and not the other, e.g., during times at which "Breaking Bad" airs and "Nova" does not, and times at which "Nova" airs and "Breaking Bad" does not.

The social media playback system can provide advantages such as reducing resources required to process the received social media content, reducing processing time required to associate social media content with one or more media programs, and enhancing the ability of the social media playback system to display information and to interact with a user. For example, by processing the social media content and extracting keywords from the content, the social media playback system may reduce the amount of processing required to identify other social media content pertaining to a media program using the keywords.

The social media playback system can reduces the processing time required to identify keywords for associating social media content and media programs through techniques such as machine learning. Calculating relevance scores based on keywords associated with media programs and comparing each score to a threshold score may reduce the amount of processing required to associate social media content and media programs by reducing the set of eligible social media content to be processed further. The extracted keywords from the social media content may improve the ability of the social media playback system to display information and interact with a user.

The methods, systems, and computer-readable storage media described in the present disclosure offer improvements to the operation of a social media playback system that interacts with and presents content to users.

Overview

A user who is experiencing a media program (for example, watching a television show or listening to a sports broadcast) can play back social media content pertaining to the media program and that was made available at previous times at which the media program was experienced by other users. In this way, a user can participate in social media relevant to (e.g., pertaining to) a particular media program, even if the media program was experienced by users at a time in the past. For example, if the media program is a television show, a user can watch a recording of the show and simultaneously read what was said on a social media service about the show during previous broadcasts of the show.

Social media content is sometimes formatted into elements of social media content. Each element may have identifying information such as an identity of an author and a time at which the content of the element was first made available (e.g., the time at which the content was authored and/or provided to a social media service for distribution). For example, the time at which the content of the element was first made available may be a timestamp indicating an absolute time, such as the hour, minute, and second on a particular day. A social media playback system that receives the element can use the timestamp to calculate an offset relative to the beginning of a media program for which the element is relevant. In this way, the social media playback system can compile social media content made available during multiple timeframes (e.g., during multiple broadcasts of the media program occurring at different times), and play back the content using the offsets to line up each element of the content with an appropriate point in time during the media program. If the social media content was provided to users of a social media service as a real-time stream of content (e.g., content was provided as soon as it was received by the author), then the playback of content simulates the real-time stream of content. In some examples, a real-time stream of social media content includes elements of social media content that were authored, provided to the social media service, and made available to other users of the social media service all at approximately the same time.

When an element of social media content is authored, provided, and made available at approximately the same time, the element can be said to have been "posted."

In some examples, an element of social media content identifies users other than a user who authored the content. For example, an element of social media content may contain a reference to a username of a user other than the user who authored the content, e.g., a username of another user of the social media service. The reference may indicate that the user authoring the content is directing the element of social media to the other user. For example, the element may represent a portion of a conversation among the users. In some examples, social media services maintain one or more databases of connections among its users. For example, users may choose to establish a connection with other users using the social media service. The social media service may provide content to users based on the connections.

As an example, the media program may be a television program, and the social media service may be Twitter, a social media service headquartered in San Francisco, Calif. Elements of social media content provided by Twitter are called "tweets" and the act of authoring and providing content to Twitter for immediate availability (e.g., posting) is called "tweeting." Tweets are typically displayed in a real-time stream called a timeline. In this example, when the television program was first broadcast, one or more users of Twitter may have tweeted about the television program (e.g., commenting on the plot, making observations about the characters, etc.), generating tweets relevant to the television program. Further, other users may have tweeted about the television program at a later time, e.g., when the program was shown in a different time zone, or during a rerun of the program, or using an online television streaming service, or at another time. The social media playback system can identify tweets that were tweeted when users watched the television program, determine which tweets are relevant to the program, and make the tweets available for playback by other users at a later time when those other users watch the television program. The tweets are played back timed relative to the start of the program. For example, if a user tweeted five minutes into the program, then the tweet is displayed five minutes into subsequent broadcasts or viewings of the program. In this way, two tweets that were tweeted days or weeks or months apart may be played back at approximately the same time (e.g., five minutes into the program) if they were tweeted at approximately the same time relative to the start of the program. Tweets typically have a timestamp indicating an absolute time, but the social media playback system can store information identifying tweets with an offset relative to the start of a particular program.

FIG. 1 shows a social media playback system 100. The social media playback system 100 communicates (using a communications network 101 such as the Internet) social media content 102 to a user 104 who is experiencing a media program 106. The media program 106 could be, for example, a film, episode of a television show, sporting event, news broadcast, or any other kind of media program. In some examples, a media program 106 has a defined start and end, and relates to one or more topics. The social media content 102 includes keywords 103 that are identified by the social media playback system 100, as explained further with respect to FIG. 2 below.

The social media content 102, which includes keywords 103, can be received from a social media service 108. In some examples, the social media content 102 could be received by the social media playback system 100 and directly provided by the social media playback system 100 to the user 104. In some examples, the social media playback system 100 could instruct the social media service 108 to provide particular social media content 102 to the user 104, a technique sometimes referred to as indirectly providing the social media content 102 by the social media service 108.

The social media content 102 provided (directly or indirectly) by the social media playback system 100 can be chosen based on its relevance to the media program 106. In some examples, the some of the social media content 102, which contains keywords 103, was originally authored by one or more others users 110 experiencing the media program 106. In some examples, the media program 106 may have been broadcast (e.g., on a television channel, or a radio station, or as a program streaming over the Internet) to many users 110 at a particular time, and during that time, the users 110 may have authored social media content 102 relating to the media program 106 during the timeframe of the broadcast. In some examples, the media program 106 may have been recorded by one of the users 110 or on behalf of one of the users 110 (e.g., if the media program is a television show or similar program, by a digital video recorder service), and some of the social media content 102 may have been authored by the user while that user experiences his or her recording at a time of his or her choice.

In some examples, the user 104 experiences the media program 106 on one device 112 (e.g., a television) and views the social media content 102 on another device 114 (e.g., a computer, smartphone, tablet device, or other electronic device). In some examples, the user 104 experiences the media program 106 and the social media content 102 on the same device (e.g., a computer displaying both a social media client and a television show, or a computer displaying a social media client and playing a streaming radio broadcast, or a "smart TV" that displays content available on a television channel as well as content received from a computer network such as the Internet, etc.).

In some implementations, the social media playback system 100 provides a user interface 116 to a user 118 of a media provider 120. A media provider is any entity which provides media content to users. In some examples, a media provider could be an entity that created the content. In some examples, a media provider could be an entity that distributes the content. A media provider could be a company, a service, a media channel (e.g., television channel or television network or radio station), or any other kind of entity. The user interface 116 enables the user 118 to specify information specific to a media program 106 (e.g., a media program provided by the media provider 120) that can be used by the social media playback service 100 to determine which social media content 102 to display to a user 104 who is experiencing the media program 106. For example, if the media program 106 is a television show, and the user 118 is a representative of the television studio or television network that produces the television show, the representative can use the user interface 116 to instruct the social media playback service 100 to select elements of social media content 102 authored by particular users or containing particular keywords relevant to the television show. This process is sometimes referred to as curation and the user interface 116 is sometimes referred to as a curation tool.

In some examples, the social media playback system 100 includes one or more servers 122, which are computer systems that carry out the operations of the social media playback system 100 and interact with other resources, e.g., the social media services 108.

System Components

Figure 2:
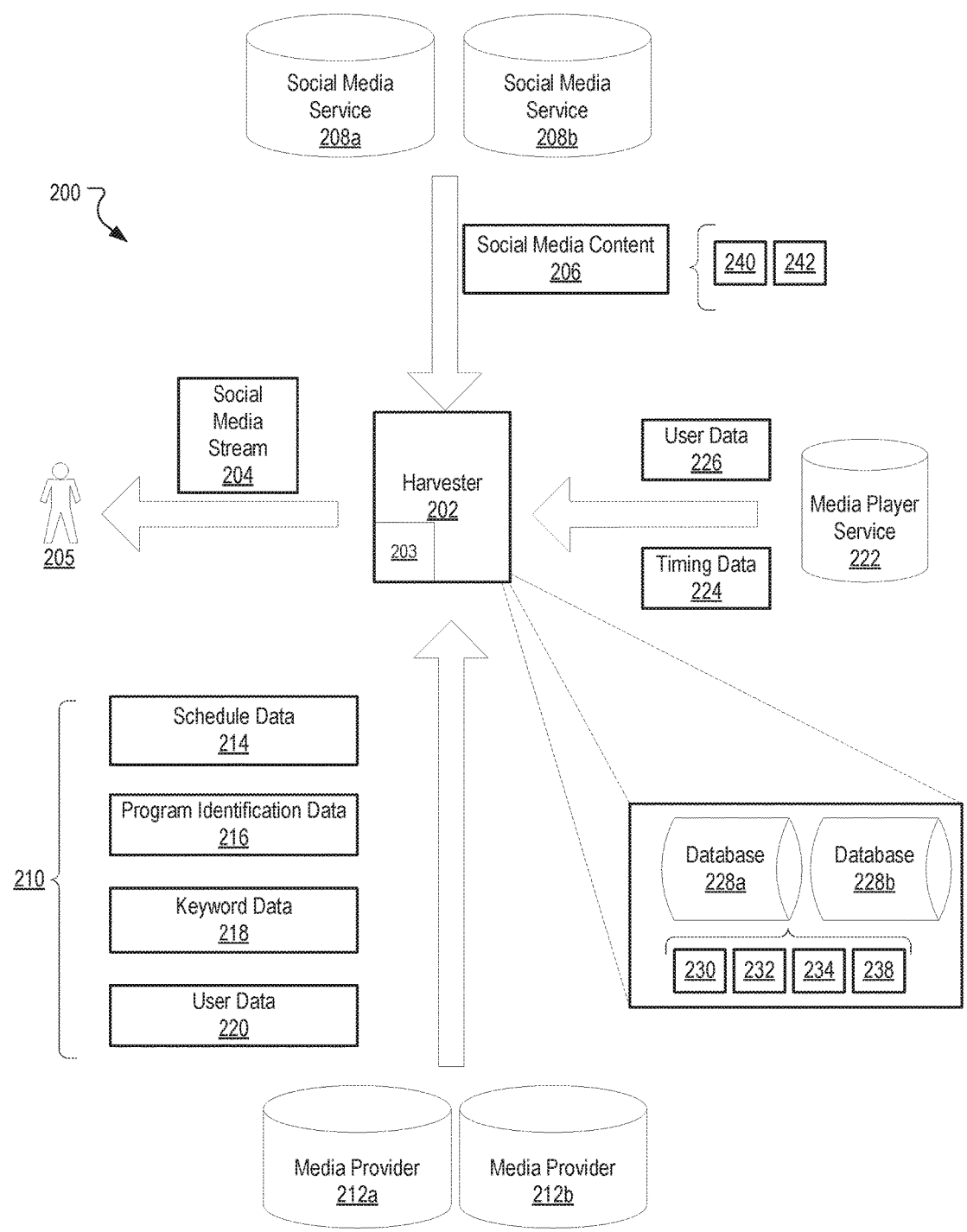

FIG. 2 shows components of a social media playback system 200. For example, the social media playback system 200 could be the social media playback system 100 shown in FIG. 1. The social media playback system includes a harvester module 202. The harvester module 202 receives data from multiple sources to provide a social media content stream 204 to each of multiple users 205.

In some implementations, the harvester module 202 receives social media content 206 from social media services 208a, 208b. The social media content 206 may each include data identifying the time at which each element of the social media content 206 was authored or provided to the social media service 208a, 208b and data identifying a user who authored or provided the social media content 206.

In some implementations, the harvester module 202 receives social media content 206 from social media services 208a, 208b by identifying a particular category of social media content 206, e.g., by supplying a search query to a social media service 208a, 208b and receiving elements of social media content 206 responsive to the search query. In some implementations, the harvester module 202 receives all social media content 206 made available by a social media service 208a, 208b and stores some or all of the content for later processing (e.g., for performing a search upon the content).

In some implementations, the harvester module 202 receives program data 210 from media providers 212a, 212b. The program data 210 may include schedule data 214, program identification data 216, keyword data 218, and user data 220.

The schedule data 214 includes information about times at which media programs (e.g., the media program 106 shown in FIG. 1) are broadcast or otherwise experienced by users. For example, if the media provider 212a, 212b is a television network, the schedule data 214 may include information about when particular television programs are broadcast on which television channels. In this way, the harvester module 202 can identify social media content 206 that was posted during a broadcast of a particular media program.

The program identification data 216 identifies particular programs in the schedule data 214. In some examples, the schedule data 214 may identify programs using an identification number, and so the program identification data 216 can be used to determine the name of a program based on an identification number. In some examples, the schedule data 214 may include multiple broadcasts of the same program, and the program identification data 216 can indicate that multiple broadcasts are of the same program.

The keyword data 218 contains information about keywords that are associated with particular media programs. For example, a list of keywords can be provided for some or all of the media programs identified in the program data 210. The keywords can be chosen by the media provider 212a, 212b associated with a particular media program. For example, if the media program is an episode of a television show, the keywords can include the name of the show, the names of the characters, the names of the actors, and so on. The harvester module 202 can use the keyword data 218 to identify which elements of social media content 206 posted during a media program are relevant to the content of the media program. In some examples, the keyword data 218 can be chosen by a media provider 212a, 212b, e.g., chosen by a representative of the media provider using a user interface operable with the harvester module 202 (e.g., the user interface 116 shown in FIG. 1, sometimes called a curation tool). In some implementations, the media provider 212a, 212b of a particular media program can identify one or more keywords associated with the keyword data 218 associated with that particular media program as the most relevant keywords associated with that particular media program. For example, if the media program is an episode of a television show, one example of a relevant keyword could be the name of the television show, and another example of a relevant keyword could be the title of the episode of the television show.

The user data 220 includes information about users of social media services 208a, 208b (e.g., the users 110 shown in FIG. 1) who post social media content relevant to media programs. For example, a user may be associated with a particular media program. For example, the user may be an actor who stars on a television show and uses a social media service 208a, 208b to talk about the show. As another example, the user may be a fan of the television show and uses a social media service 208a, 208b to give his or her opinions about the show or provide observations about the show. The user can be identified by the user data 220 and the harvester module 202 can use this information to deem that user's social media content as especially relevant to the media program. In some examples, the user data 220 can be chosen by a media provider 212a, 212b, e.g., chosen by a representative of the media provider using a curation tool operable with the harvester module 202.

In some implementations, the harvester module 202 also receives data from a media player service 222. A media player service 222 is an entity that provides media content to users on demand rather than on a fixed schedule. For example, the media player service 222 may operate a streaming video web site, and users of the media player service 222 can view media programs (e.g., television shows and movies) on the streaming video web site at a time of the users' choosing. Social media content posted by the users of the media player service 222 and relevant to a media program offered by the media player service 222 can be identified by the harvester module 202. In some implementations, the media player service 222 provides timing data 224 to the harvester module 202 identifying times at which particular media programs were experienced by users of the media player service 222. In some examples, the timing data 224 may indicate when users of the media player service 222 have paused and restarted a media program so that the harvester module 202 can determine a temporal relationship of social media content posted by users of the media player service 222 to the paused and restarted media program. The media player service 222 can also provide user data 226 identifying users of the media player service 222 as users of one of the social media services 208a. For example, the user data 226 may include a social media service 208a, 208b username also used by the user of the media player service 222. As another example, the user data 226 may include a media player service 222 username, and the harvester may store data correlating that username to a social media service 208a, 208b username. In some examples, identifying information other than usernames can be used. In this way, the harvester module 202 can identify social media content 206 posted by a user of the media player service 222 who is experiencing, for example, a streaming media program.

The harvester module 202 uses information received from social media services 208a, 208b, media providers 212a, 212b, and media player services 222 to update databases 228a, 228b. Each database 228a, 228b contains information relevant to a respective media program (e.g., media program 106 shown in FIG. 1). In some implementations the databases 228a, 228b are implemented as a single database.

In some implementations, each database 228a, 228b stores social media data 230 referencing elements of social media determined to be relevant to the media program associated with the database 228a, 228b. For example, the social media data 230 may include a uniform resource locator (URL) of each element of social media determined to be relevant to the media program. In some examples, the social media data 230 may be the data of the elements themselves.

In some implementations, each database 228a, 228b stores offset data 232. The offset data 232 indicates, for each element of social media content referenced by the social media data 230, offsets relative to the beginning of the media program associated with the database 228a, 228b. For example, the offsets may be calculated by comparing a timestamp of an element of social media content to a start time of a media program obtained from the schedule data 214 provided by a media provider 212a, 212b.

In some examples, authors of social media content 206 may experience the same media program at different times due to time zones in which the authors are present.

For example, the media program may be broadcast at an earlier time of day for viewers in a time zone corresponding to Eastern Standard Time (EST), and the media program may be broadcast at a later time of day for views in a time zone corresponding to Pacific Standard Time (PST), which is three hours behind EST. If the media program is broadcast at a start time of 6 PM EST and again at a start time of 6 PM PST, the two broadcasts will be three hours apart. One author of social media content 206 who resides in New York may post an element 240 of social media content at 6:05 PM EST, while another author of social media content 206 who resides in California may post an element 242 of social media content at 6:04 PM PST, approximately three hours later. The two elements 240, 242 of social media content may pertain to approximately the same moment in time of the media program, e.g., a moment in time about four or five minutes into the program.

The harvester module 202 can compensate for the three hour time difference when determining the offset data 232. For example, the harvester module 202, based on the schedule data 214, can identify that two broadcasts of the media program occurred. In some examples, some of the schedule data 214 specifies broadcasts for one time zone, and some of the schedule data 214 specifies broadcasts for another time zone. When the harvester receives social media content 206, the harvester module 202 can identify (e.g., based on the schedule data 214 and based on timestamps of the elements 240, 242) that the first element 240 of social media content was posted five minutes after the start time of the media program, and that the second element 242 of social media content was posted four minutes after the start time of the media program.

When data associated with the elements 240, 242 of social media content are stored in the database 228a, 228b associated with the media program, the harvester module 202 can store offset data 232 reflecting the offsets from the two different start times of the broadcasts in different time zones. For example, offset data 232 for the first element 240 can be stored that indicates an offset of five minutes, and offset data 232 for the second element 240 can be stored that indicates an offset of four minutes. The harvester module 202 need not store information about the original time zones of the elements 240, 242, for example.

In some implementations, each database 228a, 228b stores curation data 234. The curation data 234 may include data indicating which elements of social media (referenced by the social media data 230) will be displayed in a social media stream 204 provided to a user 205 of the social media playback system 200, and in what order. The curation data 234 is generated by the harvester module 202 and described in further detail with respect to FIG. 3.

A social media stream 204 is a collection of elements of social media content synchronized to a media program. Once the harvester module 202 has generated a database 228a, 228b for a particular media program, the harvester can identify which elements of social media referenced in the database will be shown to a user 205 who is experiencing the media program. The identified elements can then be assembled into a social media stream 204 and displayed to the user 205 in a manner that is synchronized with the media program, e.g., based on the offset data 232.

Further, elements of social media can be arranged in the social media stream 204 based on the offset data 232. Referring to the example above describing the elements 240, 242 of social media content authored in different time zones, the second element 242 of social media (having an offset of four minutes) will appear in the social media stream 204 (e.g., be displayed to a user 205 who receives the social media stream 204) just before the first element 240 of social media (having an offset of five minutes) appears in the social media stream 204, even though the first element 240 was posted about three hours before the second element 242.

For example, if the social media service is Twitter and the media program is an episode of a television show, the social media stream 204 can be a collection of tweets synchronized with the television show. In this example, the user 206 may be watching a re-run or later broadcast of a television show that has already aired. If a tweet was posted to Twitter five minutes into an original broadcast of the television show, then the tweet will be displayed to the user 205 five minutes into the re-run or later broadcast of the television show. The social media stream 204 could also include a tweet that was posted five minutes into a different, earlier re-run or earlier broadcast of the television show. The two tweets would be displayed at approximately the same time in the social media stream 204, because they have approximately the same offsets from the start of the television show, even though the tweets themselves were made hours, days, or months apart. The social media stream 204 could also contain content from other social media services, e.g., Facebook, GetGlue, or any other social media service.

In some implementations, the harvester module 202 includes a threshold number of elements of social media content in the social media stream 204 for a quantity of time. For example, the harvester module 202 may include no more than one element of social media content for every three seconds of time that elapses during playback of the social media stream 204 during the associated media program.

In some implementations, each database 228a, 228b stores relevant keyword data 238. The relevant keyword data 238 is data that indicates which portion of the keyword data 218 is relevant to a respective media program (e.g., media program 106 shown in FIG. 1). The relevant keyword data 238 can initially contain, in part, the most relevant keywords associated with the particular media program for the database 228a, 228b. The most relevant keywords can be identified as described above with respect to the keyword data 218 and media provider 212a, 212b.

In some implementations, the initial most relevant keywords default to a value. For example, if the media program is an episode of a television show, the most relevant keyword could be the name of the show. In some implementations, the media provider 212a, 212b provides the initial most relevant keywords for the respective media programs. The harvester 202 receives the keyword data 218 from the media provider 212a, 212b on an ongoing basis. For example, the media provider 212a, 212b can identify additional keyword data as the most relevant keywords associated with a variety of media programs, including media programs already known to the social media playback system as well as new media programs not yet known to the social media playback system, and provides the keywords on an ongoing basis. The harvester 202 continues to store the newly received relevant keyword data 238 in the database 228a, 228b as new keywords come in. In this way, the social media playback system 200 keeps the most relevant keywords for particular media programs up to date, e.g., for the purpose of providing a social media stream 204 that contains more relevant social media content to the user 205. The media provider 212a, 212b can provide new relevant keywords continuously, at specified times, by a push technique, or by other techniques. The initial relevant keyword data 238 is then updated in the databases 228a, 228b for each media program (e.g., either a television show or a particular episode) in the manner in the following paragraphs.

In some implementations, additional relevant keyword data 238 can be discovered by identifying additional received keywords in the elements of social media content 206. The harvester 202 can include a relevance calculation module 203 to calculate a relevance score for the received keyword in an element of social media content 206, based at least on part on the schedule data 214. For example, the schedule data 214 can identify social media content 206 that was posted during a broadcast of a particular media program. To identify the posted social media content 206, the harvester 202 can analyze the schedule data 214 of a particular media program. For example, the harvester 202 can compare the schedule data 214 to the timestamp of the social media content element 240 to determine if the social media content element 240 was posted during the broadcast of the particular media program. For instance, if the media program is an episode of a television show, the schedule data 214 could indicate a broadcast time of 8 pm to 9 pm on Mar. 11, 2014. In the case of Twitter, if the timestamp of a tweet is 8:15 pm, Mar. 11, 2014, then the harvester 202 can determine that the tweet was posted during the broadcast of the television program episode. This information is then made available to the relevance calculation module 203.

In some implementations, to calculate the relevance score of the received keyword, the relevance calculation module 203 can compare data associated with the received keyword to a threshold, for example, an appearance frequency being above an appearance threshold. In some implementations, if the element of social media content 206 contains other keywords associated with the relevant keyword data 238 for the media program, the relevance score of received keywords in the element of social media data 238 not associated with the relevant keyword data 238 can be adjusted, for example, increased. In some implementations, if the received keyword is similar to a keyword (e.g., the received keyword is a spelling variation of, a part of, or contains a, keyword) already associated with the relevant keyword data 238, the relevance score of the received keyword can be adjusted, for example, increased. If the relevance score of the keyword in the element of social media content satisfies a relevance score threshold, an entry is added to the relevant keyword data 238 stored in the database 228a, 228b, associating the keyword with the media program.

In some implementations, the harvester module 202 can disambiguate the received keywords. In some implementations, determining that the relevance score satisfies a relevance score threshold can be based on comparing the frequency of keyword appearance during scheduled broadcasts (also known as transmissions) of a media program to the frequency of keyword appearance during other times. For example, the schedule data 214 can indicate a schedule of broadcasts of a media program in which the media program is broadcast (e.g., on a television station) at a specified time according to a schedule and users 205 experience the media program at the time of broadcast. The relevance score can be determined to satisfy a relevance score threshold. The relevance score threshold is based on determining that a received keyword appears in at least sixty percent of the elements of social media content 206 posted during the schedule of broadcasts of the media program. If the received keyword appears in an element of social media content 206 at least the specified percentage of occurrences in the specified time period (e.g., during a broadcast of a media program) then the received keyword can be said to satisfy a frequency threshold. For example, the percentage of occurrences could be a value such as ten percent, twenty percent, or another percentage.

The relevance score threshold is also based on determining that the received keyword does not appear in a percentage, e.g., at least forty percent, of the elements of social media content 206 posted at times other than times specified by the schedule of broadcasts of the media program.

For example, in the case of Twitter, if a particular keyword #foo appears in six out of ten tweets during a broadcast of television program A and fewer than four out of ten tweets at other times, #foo is likely to be relevant to program A. Conversely if #bar appears in six out of ten tweets during a broadcast of television program A and six or more out of ten tweets during other times, #bar is less likely to be relevant to program A.

In some implementations, the harvester module 202 can disambiguate the received keywords by determining that the same keyword posted during more than one media program is relevant to one media program rather than a different program. The harvester module 202 receives social media content 206 comprising social media elements 240 (e.g., tweets) from one or more social media services 208a, 208b. Some social elements 240 contain keywords. The harvester module 202 also receives, from a media provider 212a, 212b, first schedule data 214 associated with a media program (e.g., the television program Nova), and receives, from a media provider 212a, 212b, second schedule data 214 associated with a different media program (e.g., the television program Breaking Bad). The media provider 212a, 212b could be the same media provider (e.g. the AMC television network) or different media providers (e.g., AMC and PBS).

The harvester module 202 can then determine the relevance of a keyword that is posted during the broadcasts of the multiple media programs. For example, the keyword #ChemistryDiscovery occurs in ten percent of the tweets posted during the simultaneous broadcasts (as determined from the first and second schedule data 214) of Nova and Breaking Bad. At times when Nova and Breaking Bad are not broadcast simultaneously as determined by the first and second schedule data 214, #ChemistryDiscovery occurs in twenty percent of the tweets posted during Nova and five percent of the tweets during Breaking Bad. The relevance calculation module 203 calculates a higher relevance score for #ChemistryDiscovery with respect to Nova (e.g. a ratio of 2 to 1 of percentage appearances during sole broadcasts of Nova versus percentage appearances in simultaneous Nova and Breaking Bad broadcasts) and a lower relevance score with respect to Breaking Bad (e.g. a ratio of 1 to 4 percentage appearances). The harvester module 202 determines that the relevance score for Nova satisfies a threshold (e.g., at least 2 to 1) and does not satisfy the threshold for Breaking Bad. An entry is added to the relevant keyword data 238 stored in the database 228a, 228b associating #ChemistryDiscovery with Nova. If an entry in the relevant keyword data 238 in the database 228a, 228b already associates #ChemistryDiscovery with Breaking Bad, the entry is removed.

In some examples, one or more features of the social media playback system 100 or the harvester module 202 provide one or more of the following example advantages: reducing resources required to process the received social media content, reducing processing time required to associate social media content with one or more media programs, and enhancing the ability of the social media playback system 100 to display information and interact with a user. For example, by processing the social media content and extracting keywords from the content, the social media playback system 100 may reduce the amount of processing required to identify other social media content pertaining to a media program using the keywords.

In some examples, the social media playback system 100 reduces the processing time required to identify keywords for associating social media content and media programs through techniques such as machine learning. For example, the social media playback system 100 may determine that an identified keyword is similar to another keyword already associated with particular social media content or a media program and associated the identified keyword with the particular social media content or the media program.

Calculating relevance scores based on keywords associated with media programs and comparing each score to a predetermined threshold may reduce the amount of processing required to associate social media content and media programs by reducing the set of eligible social media content to be processed further.

The extracted keywords from the social media content may improve the ability of the social media playback system 100 to display information and interact with a user. For example, the social media playback system 100 may use the extracted keywords to identify and present social media content synchronized with and relevant to one or more media programs without manual input or processing by a human. The methods, systems, and computer-readable storage media described in the present disclosure offer improvements to the operation of a social media playback system that interacts with and presents content to users.

Figure 3:
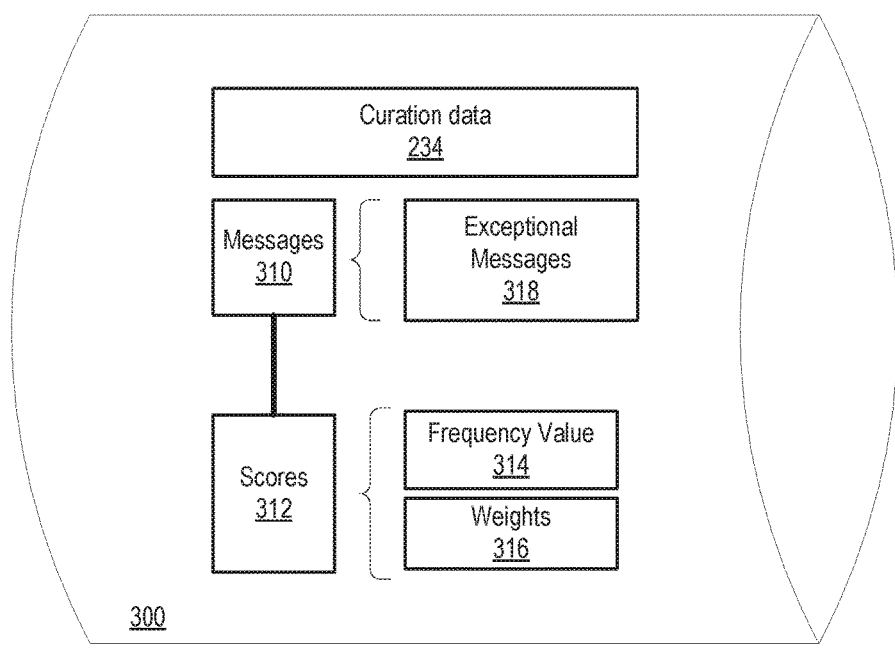

FIG. 3 shows a database 300. For example, the database 300 could be one of the databases 228a, 228b shown in FIG. 2, storing curation data 234.

Information in the database 300 can be used to indicate that a particular element of social media content (here called social media messages or simply messages) should be ranked higher than another message. For example, the messages can be ranked. The ranking can then be used to retrieve only messages that are, based on the ranking, most likely to relate to a topic of a media program associated with the database 300. The ranking can be used to pare down a number of messages to be delivered to users experiencing the media program, e.g., by only providing a threshold number of messages.

In some implementations, the database may store one or more messages 310 each associated with a score 312. The score 312 indicates a priority of the associated message 310, such that a first message having a score higher than a second message will be more likely to be chosen for a social media stream 204 (FIG. 2) than the second message. The score 312 can be calculated based on a frequency value 314 and a weight 316.

In some implementations, the score 312 can be based on a technique called term frequency-inverse document frequency. In some examples, each message is separated into words, and then for each of those words, the frequency of the words within the message and the frequency of the same words across all messages 310 associated with a media program can be evaluated. Each of the words can be assigned a value indicating the importance of the word. In some examples, a word that appears frequently in all messages 310 associated with a media program may be assigned a value indicating a lower importance than words that appear less frequently. For example, words such as "the" or "and" may appear frequently in the messages 310 and be assigned a low importance value. The importance values of the words can be summed together to generate a frequency value 314.

Each message 310 can also be associated with one or more weights 316. A weight 316 is a value that modifies the frequency value 314 to generate the score 312. For example, the frequency value 314 can be multiplied by one or more weights 316 to generate the score 312.

In some implementations, keyword data 218 (FIG. 2) can be used to calculate a weight 316. For example, if a message 310 contains one or more keywords identified in the keyword data 218, then the message 310 can be assigned a weight 316 that would increase the score 312 relative to messages that contain none of the keywords. As another example, if a message 310 contains one or more banned words identified in the keyword data 218, then the message 310 can be assigned a weight 316 that would decrease the score 312, e.g., a weight of zero.

In some implementations, user data 220 (FIG. 2) can be used to calculate a weight 316. For example, if a message 310 was authored by a user identified in the user data 220, then the message 310 can be assigned a weight 316 that would increase the score 312 relative to messages that were not authored by a user identified in the user data 220 (e.g., a user identified as belonging to a special category such as "celebrity" or "superfan").

In some implementations, the database 300 contains curation data 234. The curation data 234 specifies which messages 310 will be included in a social media stream 204 (FIG. 1). In some examples, the curation data 234 specifies a number of messages based on a threshold number of messages for a quantity of time. For example, the threshold may be one message for every three seconds of time elapsed in the social media stream 204 during playback of the stream.

The messages 310 specified by the curation data 234 can be chosen based on the scores 312. In some examples, all of the messages 310 associated with a span of time are identified, e.g., based on offsets (e.g., offset data 232 shown in FIG. 2) associated with the messages. For example, all messages having an offset of three seconds to six seconds after the start time of a media program can be identified. Of those messages, the message 310 having the highest score 312 can be chosen. In this way, the curation data 234 can include messages 310 automatically chosen based on the scores.

In some examples, the database 300 can include data indicating exceptional messages 318 among the messages 310. For example, messages identified as having been authored by a user having special status (e.g., a celebrity associated with a media program) may always be specified by the curation data 234 for inclusion in a social media stream, even if those messages would exceed a threshold number of messages for a quantity of time. In some examples, an exceptional message 318 may also appear in a social media stream for a longer period of time than other messages 310.

In some examples, the curation data 234 data specifies messages that were manually rejected or manually accepted by a user operating a user interface (e.g., the user interface 116 shown in FIG. 1). For example, a message that was manually rejected may never appear in a social media stream 204.

The curation data 234 can be updated over time. In some implementations, the harvester module 202 (FIG. 2) updates the curation data 234 each time new social media content pertaining to a media program is received. For example, the harvester module 202 may update the curation data 234 (including, for example, adding messages 310 and updating the scores 312) after each broadcast of a media program.

Computer Systems

Figure 4:
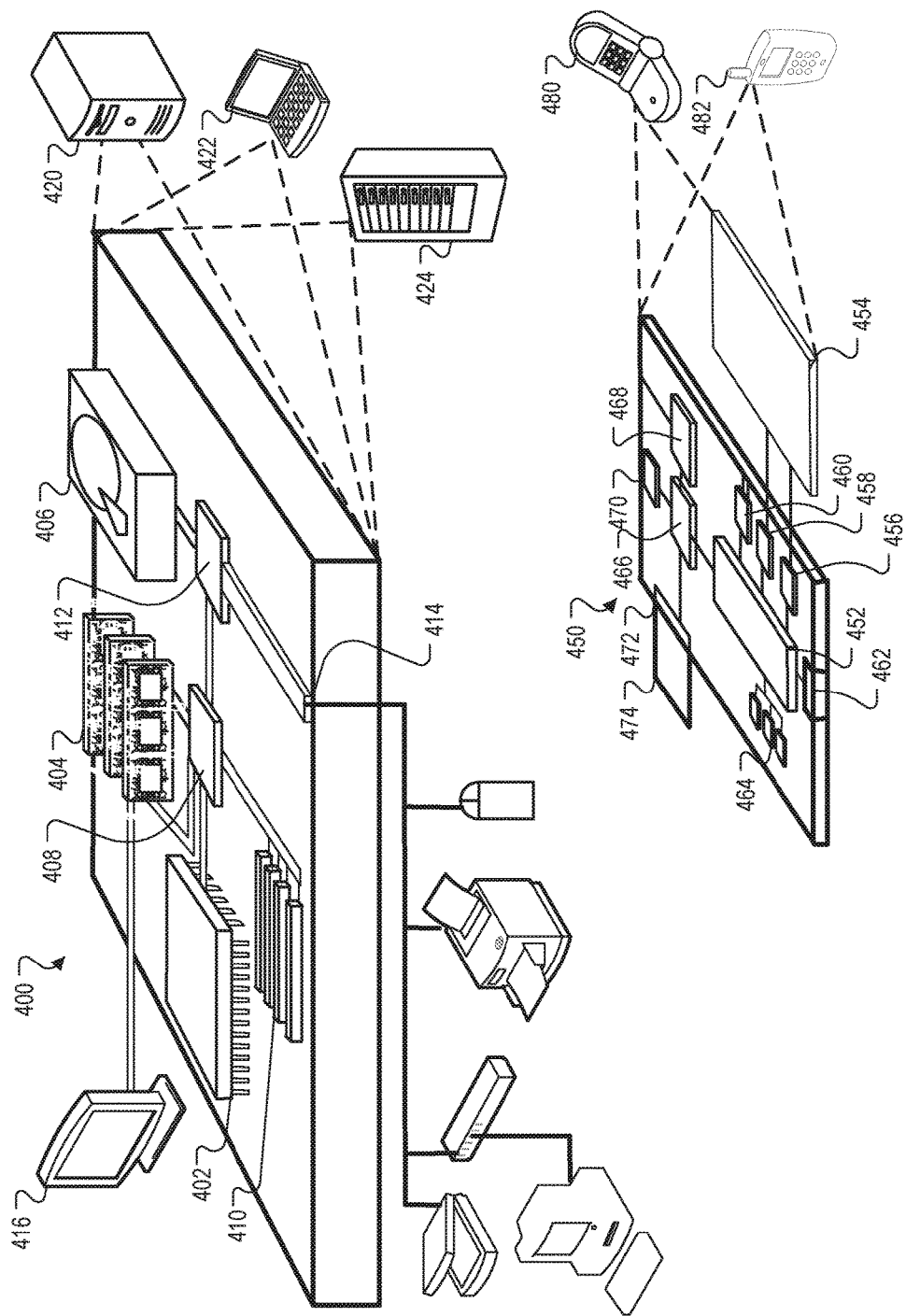
FIG. 4 shows computing devices.

FIG. 4 is a block diagram of example computing devices 400, 450. For example one computing device 400 could be a portion of the social media playback system 108 shown in FIG. 1. For example, the computing device 400 could be a server 122 (FIG. 1) that executes the harvester module 202 shown in FIG. 2 (e.g., carry out instructions representing the operations of the harvester module 202). In some examples, multiple servers, e.g., multiple computing devices 400, are used to execute the harvester module 202. In some examples, the computing device 450 could be one of the devices 112, 114 shown in FIG. 1. For example, if the computing device 450 could be a mobile computing device (e.g., laptop, smartphone, tablet computer). In some examples, one of the devices 112, 114 shown in FIG. 1 could be an example of the computing device 400.

One computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 (e.g., a computer monitor or television) coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, memory on processor 402, or a propagated signal.

The high speed controller 408 manages bandwidth-intensive operations for the computing device 400, while the low speed controller 412 manages lower bandwidth-intensive operations. Such allocation of functions is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device, such as mobile computing device 450. Each of such devices may contain one or more of computing device 400, 450, and an entire system may be made up of multiple computing devices 400, 450 communicating with each other.

The mobile computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

The processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, memory on processor 452, or a propagated signal that may be received, for example, over transceiver 468 or external interface 462.

The mobile computing device 450 may communicate wirelessly through communication interface 466, e.g., an Ethernet card, a serial communication device, e.g., an RS-232 port, and/or a wireless interface device, e.g., an 802.11 card, a 3G wireless modem, a 4G wireless modem, or another interface, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (e.g., the transceiver 104 shown in FIG. 1). In addition, GPS (Global Positioning System) receiver module 470 may provide additional navigation- and location-related wireless data to device 450, which may be used as appropriate by applications running on device 450.

The mobile computing device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, and so forth) and may also include sound generated by applications operating on device 450.

The mobile computing device 450 may be implemented in a number of different forms, as shown in the figure. For example, it may be implemented as a cellular telephone 480. It may also be implemented as part of a smartphone 482, personal digital assistant, or other similar mobile device.

A server can be realized by instructions that upon execution cause one or more processing devices to carry out processes relevant to the functions described above. Such instructions can comprise, for example, interpreted instructions such as script instructions, or executable code, or other instructions stored in a computer readable medium. A server can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

Although example devices have been described in FIG. 4, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible program carrier, for example a computer-readable medium, for execution by, or to control the operation of, a processing system. The computer readable medium can be a physical device such as a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of a social media playback system 100) is a general purpose computer, and sometimes it is a custom-tailored special purpose electronic device, and sometimes it is a combination of these things. Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Methods of Operation

Figure 5A:
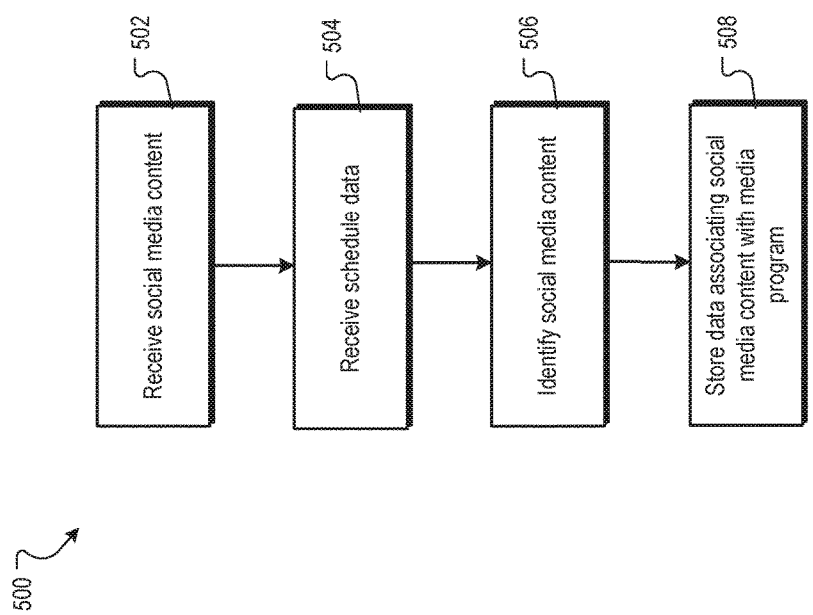

FIG. 5A shows a flowchart of a process 500 representing operations of a social media playback system (e.g, the social media playback system 100 shown in FIG. 1). Social media content is received 502 from at least one social media service. The social media content includes elements of social media. For example, the social media content could be the social media content 102 shown in FIG. 1, and the social media service could be the social media service 108 shown in FIG. 1.

Schedule data pertaining to at least one media program is received 504 from at least one media provider. For example, the media program could be the media program 106 shown in FIG. 1 and the media provider could be the media provider 120 shown in FIG. 1.

Social media content relevant to the media program is identified 506 at least in part based on the schedule data. For example, the schedule data could be the schedule data 214 shown in FIG. 2. In some implementations, keyword data 218 is used to identify the social media content. For example, social media content containing one or more keywords of the keyword data 218 may be identified.

Data associating the identified social media content and the media program is stored 508. The data indicates times associated with respective elements of social media content. For example, the data could be stored in one of the databases 228a-b shown in FIG. 2.

The times are expressed as an offset relative to a time associated with the media program. In some implementations, the time associated with the media program is a start time of the media program. For example, the times associated with respective elements of social media can be each expressed as an offset from the start time of the media program. In this way, the social media playback system need not make calculations for time zones or different broadcasts of the media program when synchronizing the social media content with the media program.

In some implementations, the process 500 includes providing, to a user of the social media playback system, at least some of the identified social media content. For example, the social media content can be presented in a user interface as a stream of content synchronized to the media program. In some implementations, the stream of content is synchronized to the media program based on the offset associated with respective elements of social media content of the stream. The stream of content could be the social media stream 204 shown in FIG. 2.

In some implementations, the process 500 includes receiving, from an entity associated with the media provider (e.g., from a user associated with or authorized by the media provider), data specifying characteristics of social media content. Further, social media content relevant to the media program can be identified, at least in part based on the data specifying characteristics of social media content. The characteristics could include one or more authors of social media content or one or more keywords.

In some implementations, social media content is received (502) in response to receiving (504) schedule data. For example, the social media playback system can provide, to the social media service, a query that is based on the received schedule data, and the social media service can provide the social media content.

FIG. 5B shows a flowchart of another process 510 representing operations of a social media playback system (e.g., the social media playback system 100 shown in FIG. 1).

An indication is received 512 that a user has begun experiencing a media program. For example, the user could be a user known to the social media playback system 100, e.g., a user having a user account associated with the social media playback system 100.

Social media content pertaining to the media content is identified 514. For example, the social media content may be stored in a database that is associated with the media program, e.g., the database may be assigned to the media program.

A stream of social media content is generated 516. For example, the stream of social media content is based on the social media content in the database. In some examples, the stream of social media content can be generated based on curation data associated with the database. Some of the social media content stored in the database may not be included in the stream, based on the curation data.

The stream of social media content is provided 518 to the user. In some implementations, the stream of social media content can be synchronized to the media program, e.g., based on offsets associated with each element of the social media content. For example, social media content having an offset of five minutes can be provided to the user five minutes into the media program.

Figure 5C:
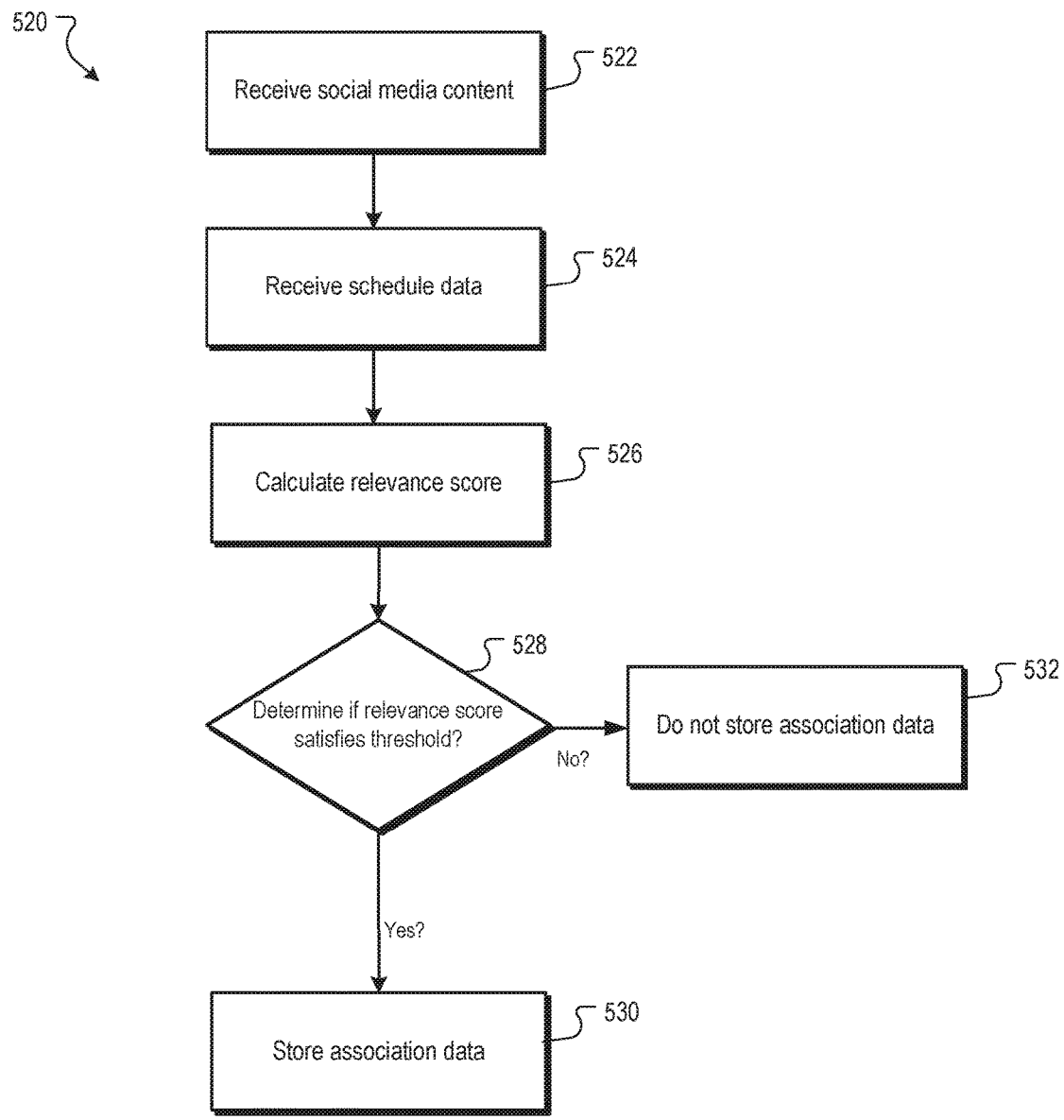

FIG. 5C shows a flowchart of another process 520 representing operations of a social media playback system (e.g., the social media playback system 200 shown in FIG. 2). Social media content is received 522 from at least one social media service. The social media content includes elements of social media. For example, the social media content could be the social media content 206 shown in FIG. 2, and the social media service could be the social media service 208a, 208b shown in FIG. 2. Schedule data pertaining to at least one media program is received 524 from at least one media provider. For example, the media program could be the media program associated with the program data 210 shown in FIG. 2 and the media provider could be the media provider 212a, 212b shown in FIG. 2.

A relevance score is calculated 526 for one or more keywords appearing in the elements of social media, the relevance score indicates the respective keyword's relevance to the media program. The relevance score could be calculated, for example, by the relevance score module 203 shown in FIG. 2, as described above. For example, if the media program is an episode of a television show, the keyword could contain, in part, the name of the television show. The relevance score calculation is also based on the received schedule data 524. For example, in the case of Twitter, if a timestamp for a tweet containing a keyword indicates that the keyword was posted in seven tweets out of the ten tweets posted during the broadcast of an episode of a television show, a relevance score is calculated 526 (e.g. seventy percent) indicating that keyword's relevance to the episode of the television show. The relevance can also be a function of other factors such as broadcast schedule and occurrence frequency where each factor is weighted by a constant.

The calculated relevance score is determined to satisfy a threshold 528. For example, if a keyword appears in a percentage, e.g., at least sixty percent, of the tweets posted during the broadcast of a television episode, the threshold is satisfied. Association data is stored 530 associating the keyword with the media program. For example, as shown in FIG. 2, an entry is added to the relevant keyword data 238 stored in the database 228a, 228b for the media program. If the threshold is not satisfied, association data is not stored 532 associating the keyword with the media program.

As part of determining that a relevance score satisfies a threshold 528, keywords can be disambiguated by comparing the frequency of keyword appearance during scheduled broadcasts (also known as transmissions) of a media program to the frequency of keyword appearance during other times. For example, in the case of Twitter, if a particular keyword #foo appears in sixty percent of tweets during a broadcast of television program A and fewer than sixty percent of tweets at other times, #foo is likely to be relevant to program A. Conversely if #bar appears in sixty percent of tweets during a broadcast of television program A and sixty percent or more during other times, #bar is less likely to be relevant to program A.

Figure 5D:
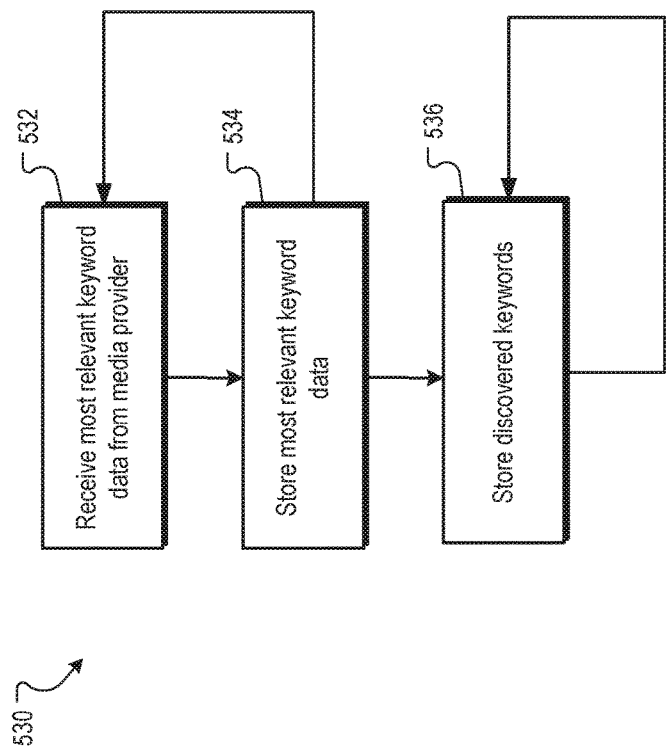

FIG. 5D shows a flowchart of another process 530 representing operations of a social media playback system (e.g., the social media playback system 200 shown in FIG. 2). The social media playback system receives 532 from a media provider (e.g., the media provider 212a, 212b shown in FIG. 2) the initial most relevant keyword data for a media program. For example, if the media program is an episode of a television show, the most relevant keyword could be the name of the show. The system stores 534 the most relevant keyword data in a database (e.g., the database 228a, 228b shown in FIG. 2).

The system receives 532 the keyword data from the media provider on an ongoing basis. For example, the media provider can identify additional keyword data as the most relevant keywords associated with a variety of media programs, including media programs already known to the social media playback system as well as new media programs not yet known to the social media playback system, and provides the keywords on an ongoing basis. The system continues to store 534 the newly received keyword data in the database as new keywords come in. In this way, the social media playback system keeps the most relevant keywords for particular media programs up to date, e.g., for the purpose of providing a social media stream (e.g., the social media stream 204 in FIG. 2) that contains more relevant social media content to a user (e.g., the user 205 in FIG. 2). The media provider can provide new relevant keywords continuously, at specified times, by a push technique, or by other techniques. The initial relevant keyword data is then updated in the database for each media program (e.g., either a television show or a particular episode) in the manner shown above in FIG. 2. In some implementations, additional discovered keywords can be iteratively stored 536 in the database by identifying additional relevant received keywords in the elements of social media content as shown above with respect to FIGS. 2 and 5C.

User Interfaces

Figure 6:
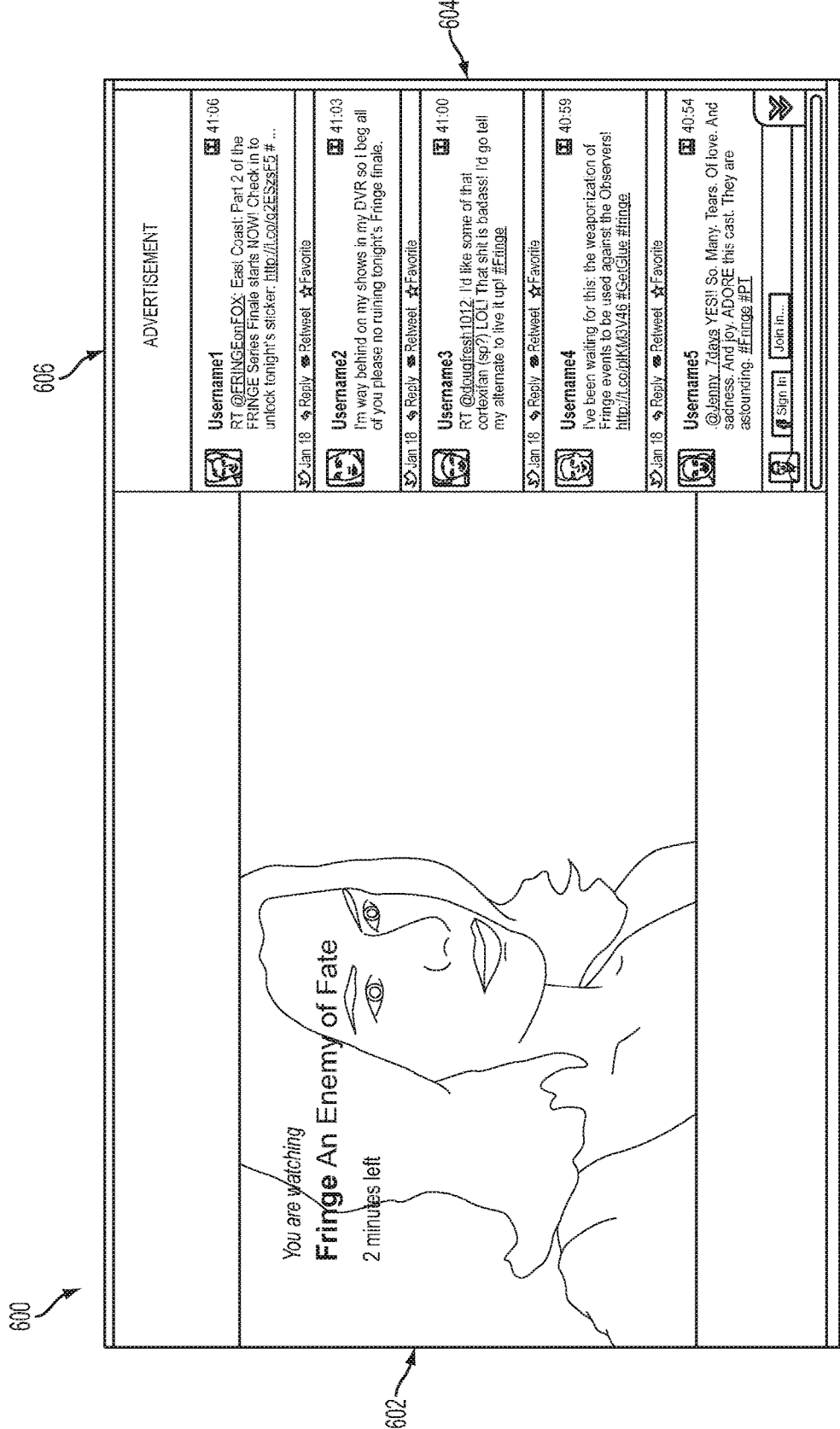

FIG. 6 shows an example user interface 600 of the social media playback system 100 (FIG. 1). For example, the user interface 600 could be displayed on one of the devices 112, 114 shown in FIG. 1. The user interface 600 includes a media viewing pane 602, a social media pane 604, and an advertisement area 606. A user of this interface 600 can experience a media program in the media viewing pane 602 while simultaneously playing back social media content pertaining to the media program in the social media pane 604. For example, the social media content displayed in the social media pane 604 may be a portion of a social media content stream 204 (FIG. 2). In this way, a user can undergo an experience of participating in "live" social media discussion even though the social media content may have been entered at previous times at which the media program was experienced by other users. In addition to viewing other people's content (here, sometimes referred to as messages), a user of the user interface 600 may sign in to a particular social network by clicking the "Sign in" button 608 at the bottom of the social media pane 604. The user may add her own messages to the current social media stream by clicking the "Join in" button 610. While the user is engaged in these activities, the advertisement area 606 can display advertisements relevant to the media program being viewed or relevant to the social media content displayed in the social media pane 604 or both. For example, the advertisements can be chosen by the social media playback system 100.

As time passes, the messages displayed in the social media pane 604 can scroll (e.g., scroll upward), so that new messages can enter into view and old messages exit from view.

Figure 7:
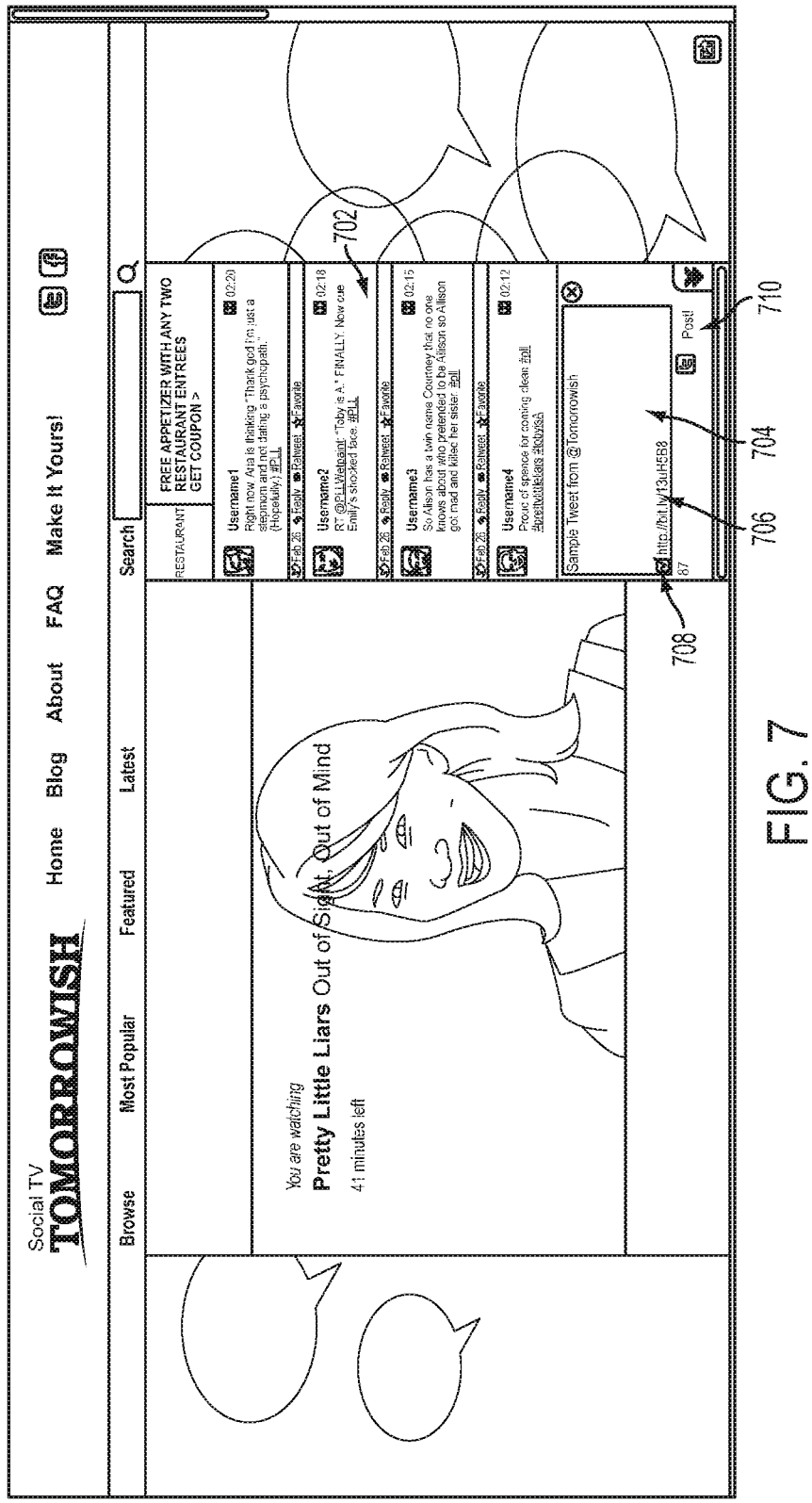

FIG. 7 shows another view of the user interface 600. In this view, a user has clicked the "Join in" button 610 at the bottom of the social media pane 604 (FIG. 6). As a result, a new text area 704 has opened up in the social media pane 702 for the user to add a new message. A shortened URL 706 is automatically inserted into the text area 704 that points to a specific moment in the media program the user is watching when the user decides to add the message. For example, another user (e.g., another user of the social media service) could use the shortened URL 706 to view the moment in the media program. A checkbox 708 is also provided next to the URL. The selection of the checkbox instructs the social media playback system 100 to append the URL to the user's message. Clicking the post button 710 below the text area 704 adds the newly created message to the social media stream.

Figure 8:
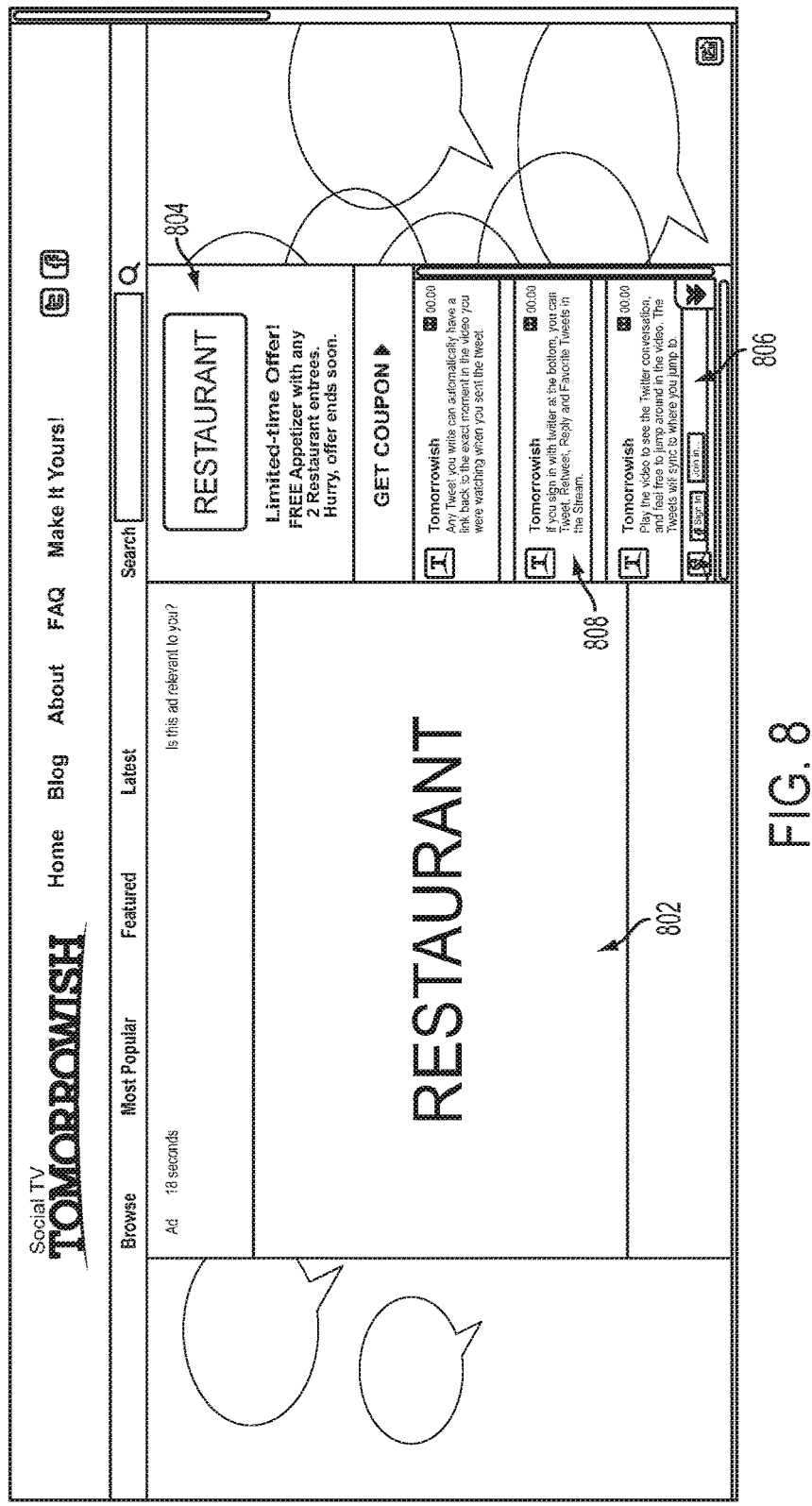

FIG. 8 shows another view of the user interface 600. In this view, the media program being viewed has entered a commercial break (e.g., a period in which advertisements are displayed). In some examples, social media content relevant to a media program is not available at times at which advertisements were displayed between segments of the media program, and so social media content need not be displayed. In some implementations, the commercial is shown in the media viewing pane 802, the advertisement area 804 expands into the space previously occupied by the social media pane 806 and displays matching advertisements to that shown in the media viewing pane 802. The social media content pertaining to the media program may also be replaced with customized vendor messages 808. In some implementations, the social media playback system 100 (FIG. 1) is provided information about advertisements shown during a media program (e.g., provided information by a media provider 120 as shown in FIG. 1), and the social media playback system 100 uses the provided information to determine an advertisement to display in the advertisement area 804 that is related to the advertisement shown in the media viewing pane 802.

Figure 9:
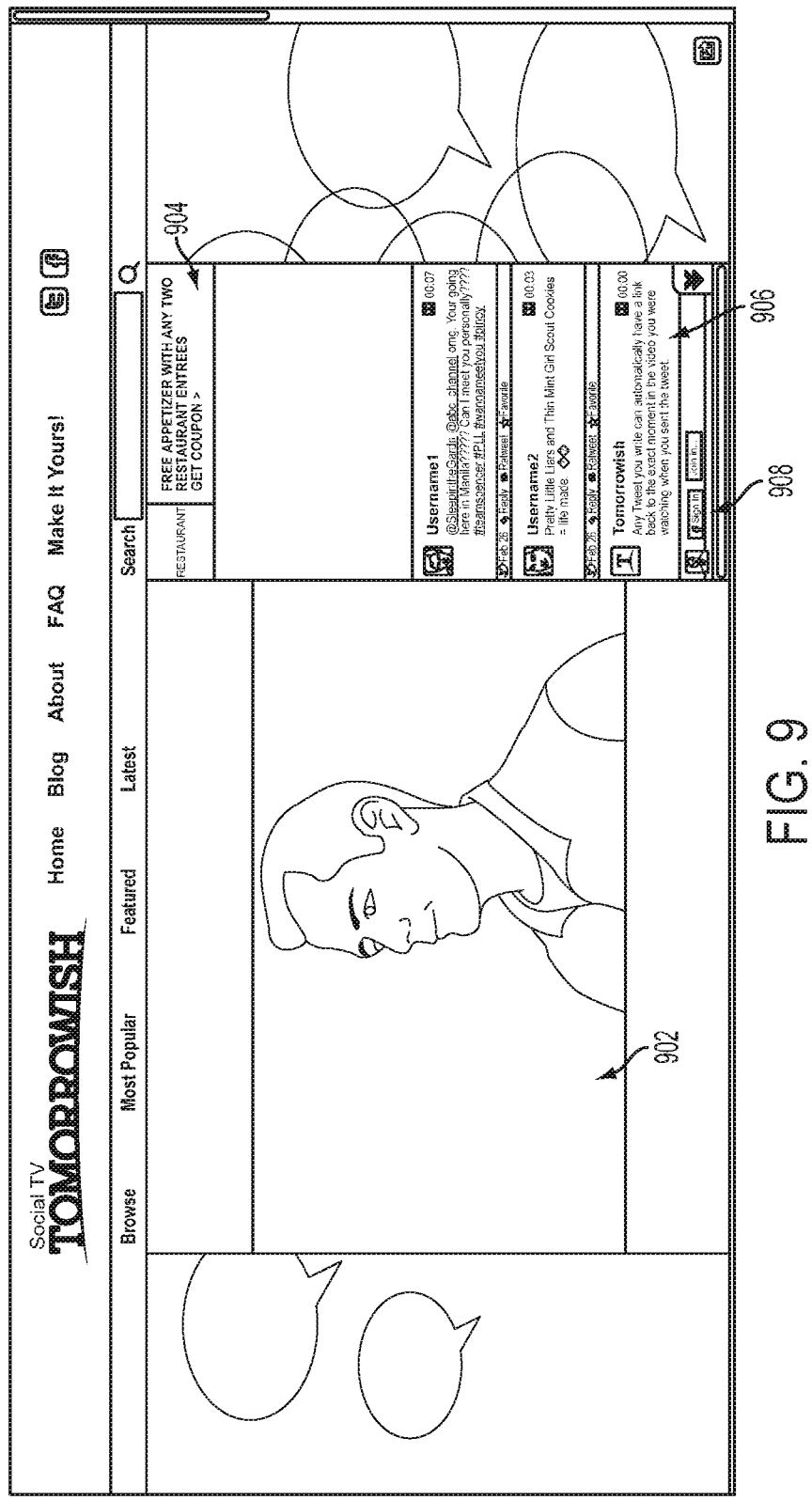

FIG. 9 shows another view of the user interface 600. In this view, the media program has resumed playing in the media viewing pane 902. As a result, the advertisement area 904 retracts as the social media pane 906 expands. Elements of social media content pertaining to the media program being played also re-appear in the social media pane 906, together with the buttons 908 for signing in to another social network or joining in the current social media discussion.

Figure 10:
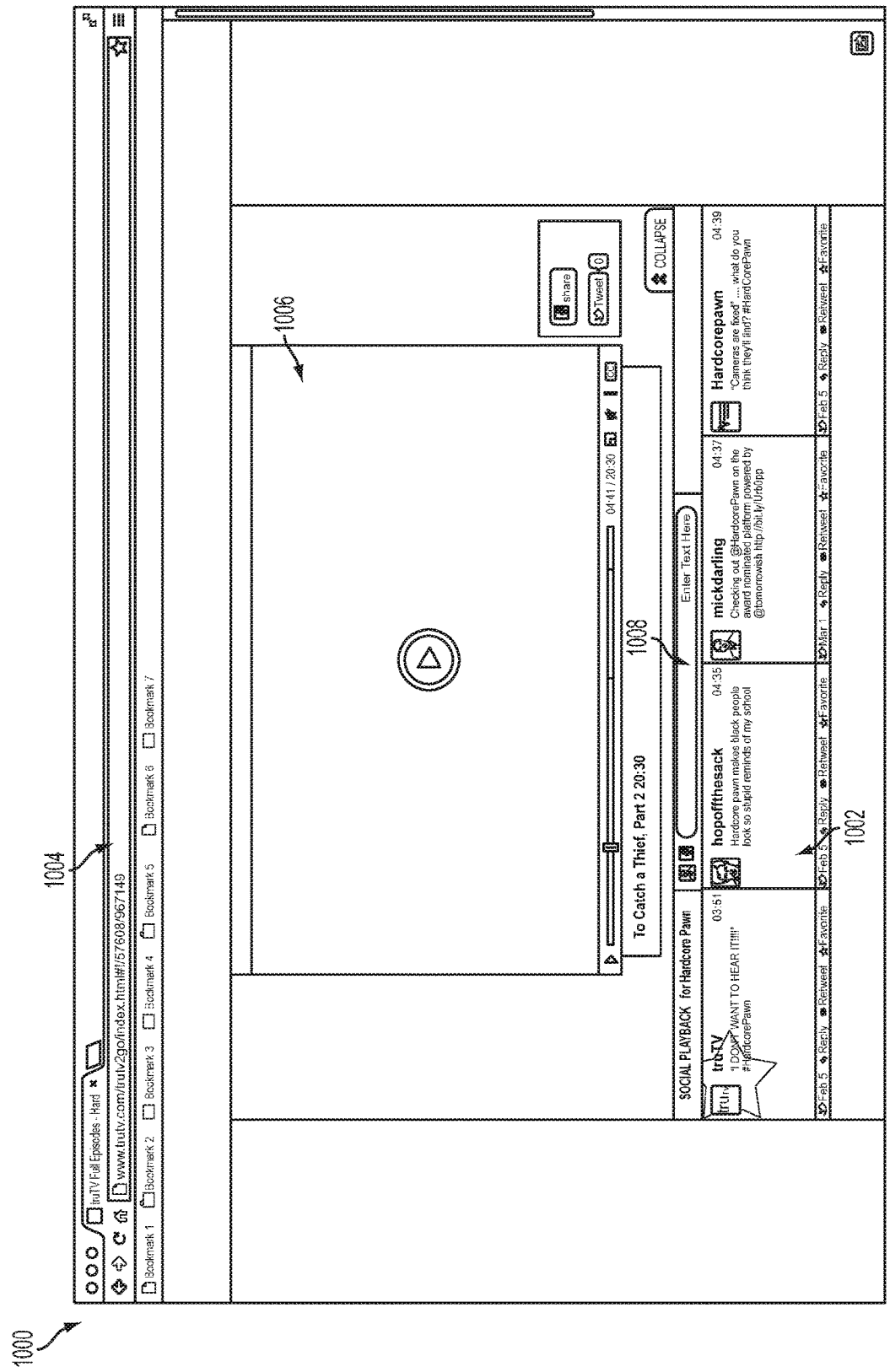

FIG. 10 shows an example user interface 1000 of the social media playback system 100 (FIG. 1). For example, this user interface 1000 may be an example of the user interface 116 shown in FIG. 1. In this user interface 1000, a horizontal social media pane 1002 is embedded into a main web page 1004 and appears below the media viewing pane 1006. While the media program is being played, elements of social media content related to the segment of the media program being watched move across the social media pane 1002 from right to left. Users wishing to participate in the social media discussion can enter their own messages in the text area 1008.

Figure 11:
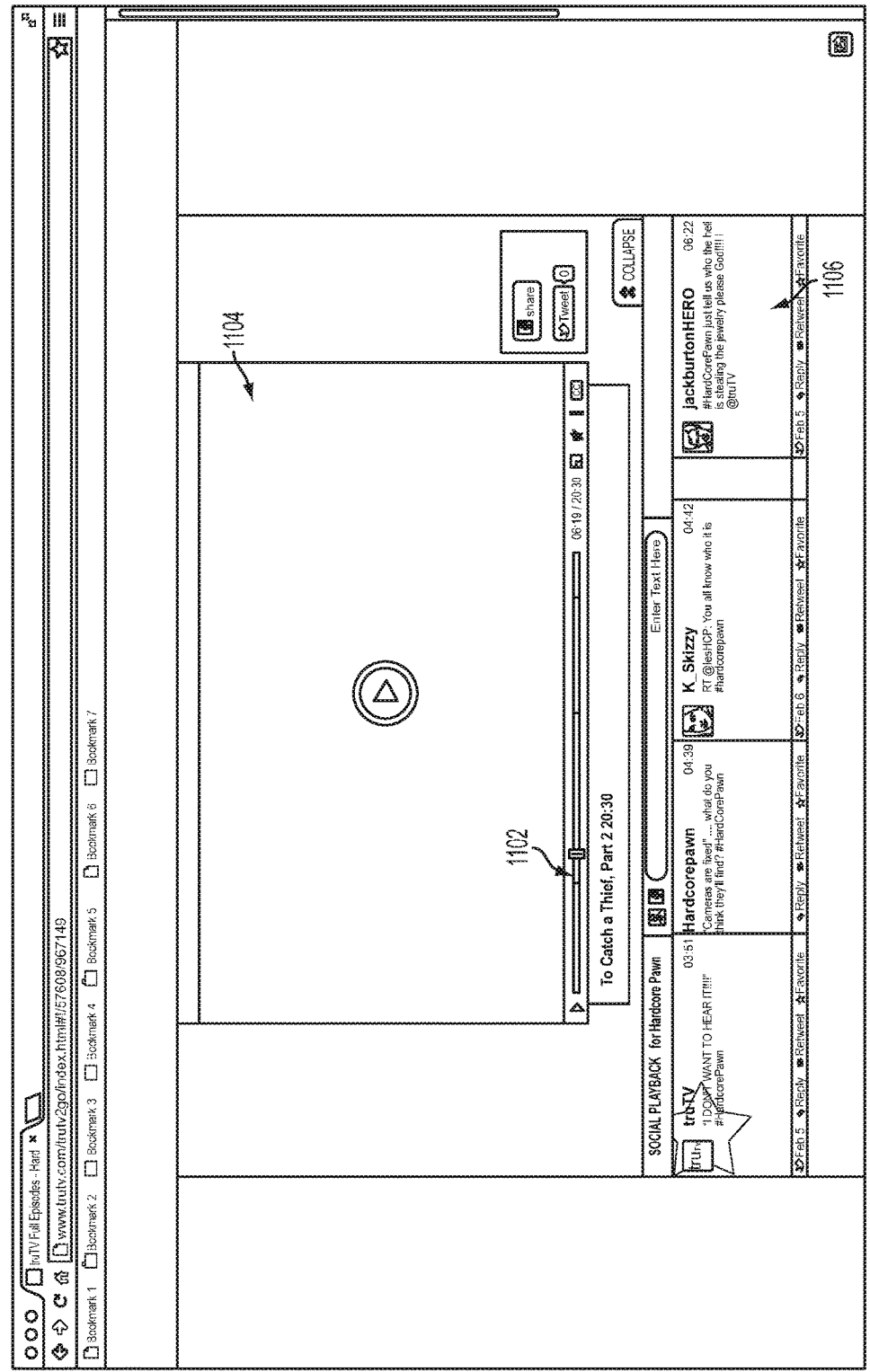

FIG. 11 shows techniques in which the social media playback system 100 (FIG. 1) automatically synchronizes social media content to the progress of the relevant media program being viewed. In this view 1100, a viewer of the media program has used the sliding bar 1102 in the media viewing pane 1104 to fast-forward (e.g., shift in time) to time index 06:19 of the media program. As a result, the social media pane 1106 now shows a social media message created by another viewer while watching the 06:22 segment of the media program. Content shown in the social media pane 1106 is synchronized to the segment of the media program to which the user has shifted to. For example, the content shown in the social media pane 1106 may be associated with an offset of approximately 06:22, indicating that the content was posted approximately 06:22 after the start of the media program and indicating that the content should be played back at approximately 06:22 after the start of the media program.

Figure 12:
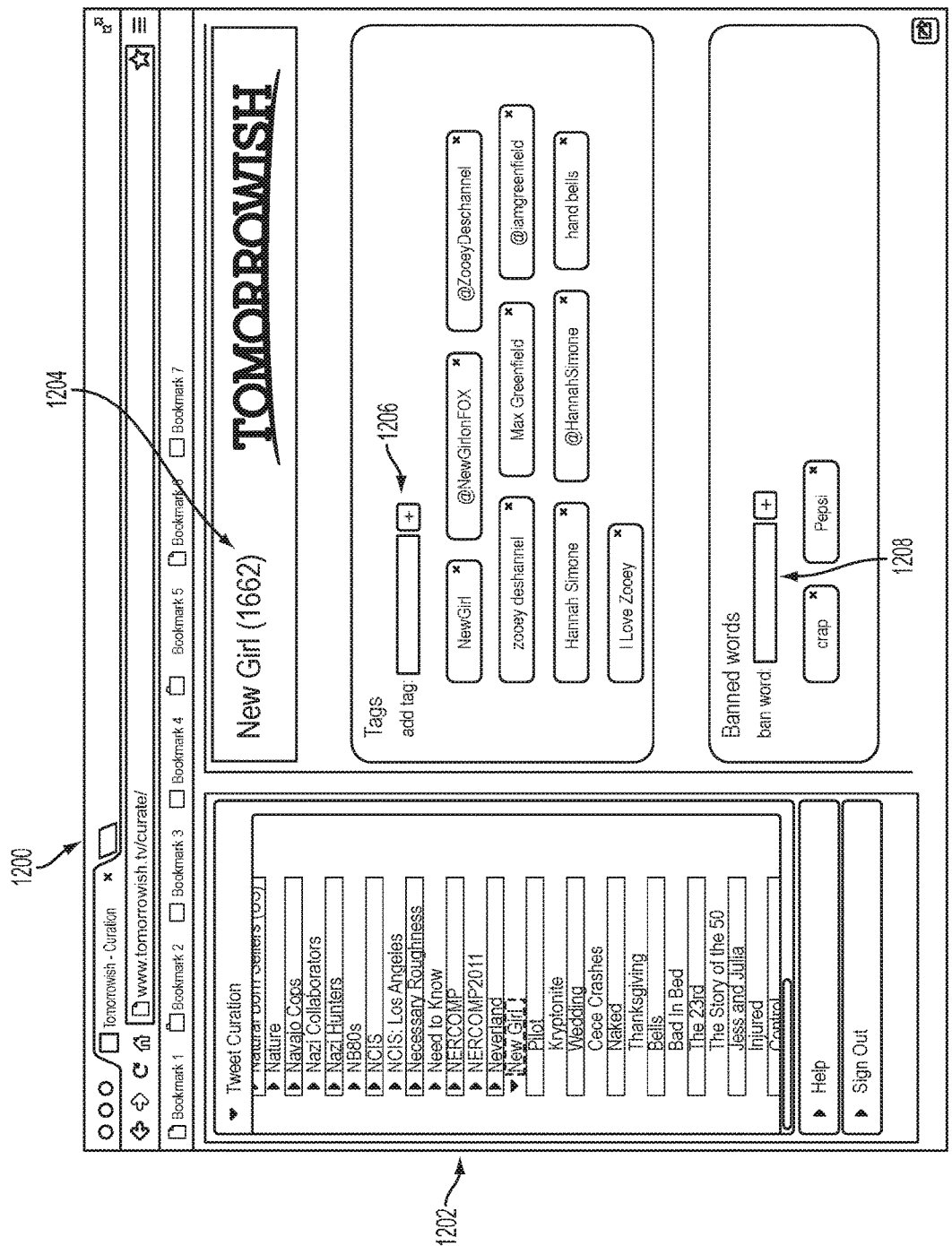

FIG. 12 shows an example user interface 1200 for accessing one functional area of a curation tool (e.g., user interface 116 shown in FIG. 1). An authorized user (e.g. a user 118 authorized by a media provider 120 as shown in FIG. 1, who could be, for example, the producer of a TV program) can use this interface 1200 to instruct the social media playback system 100 to search and capture social media messages that contain particular tags (which can be, for example, keywords). For example, an authorized user can use a series and episode selection drop-down 1202 to select an episode of the TV program. Upon the selection, the user interface 1200 displays the name and program id of the selected episode in the program information area 1204. The user then enters a new tag (e.g., keyword to be used in keyword data 218 as shown in FIG. 2) using a text field 1206. Once saved, the tag appears below the text field 1206 from where it can be later removed by an authorized user. Using a similar mechanism, an authorized user can ban social media messages that contain particular tags. The user accomplishes this task by specifying the banned words in the banned words text area 1208, in the same way as specifying tags. Banned words can be later removed just like removing tags. In some examples, the social media playback system 100 (FIG. 1) can automatically identify elements of social media content containing banned words and mark them as rejected in a database, e.g., the database 300 shown in FIG. 3.

Figure 13:
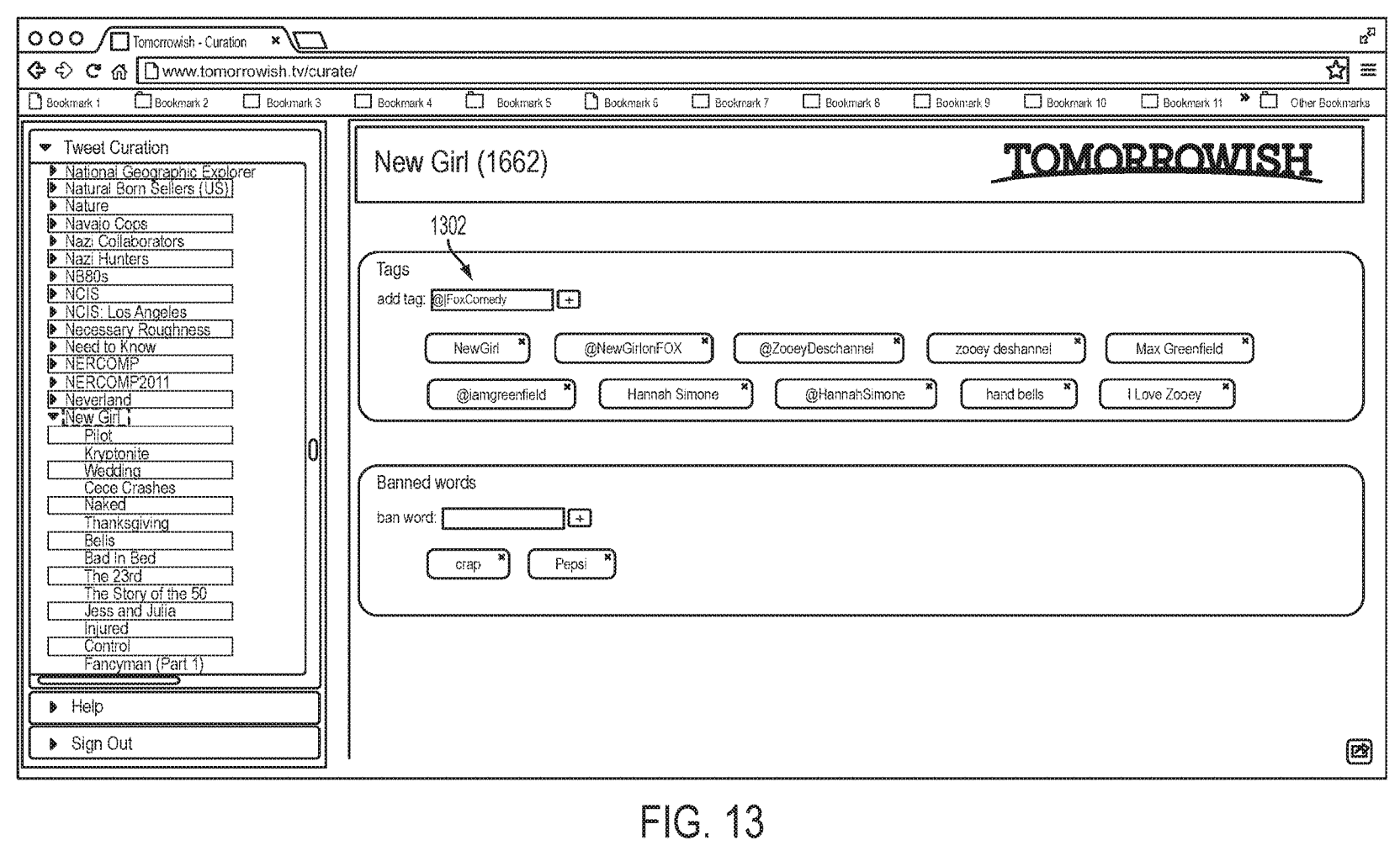

FIG. 13 shows another view of the user interface 1200. In this view, an authorized user of the user interface 1200 has entered a new tag "@FoxComedy" in the text field 1302. Here, the tag can represent a user associated with the media program. For example, the user may be a user identified by the user data 220 shown in FIG. 2.

Figure 14:
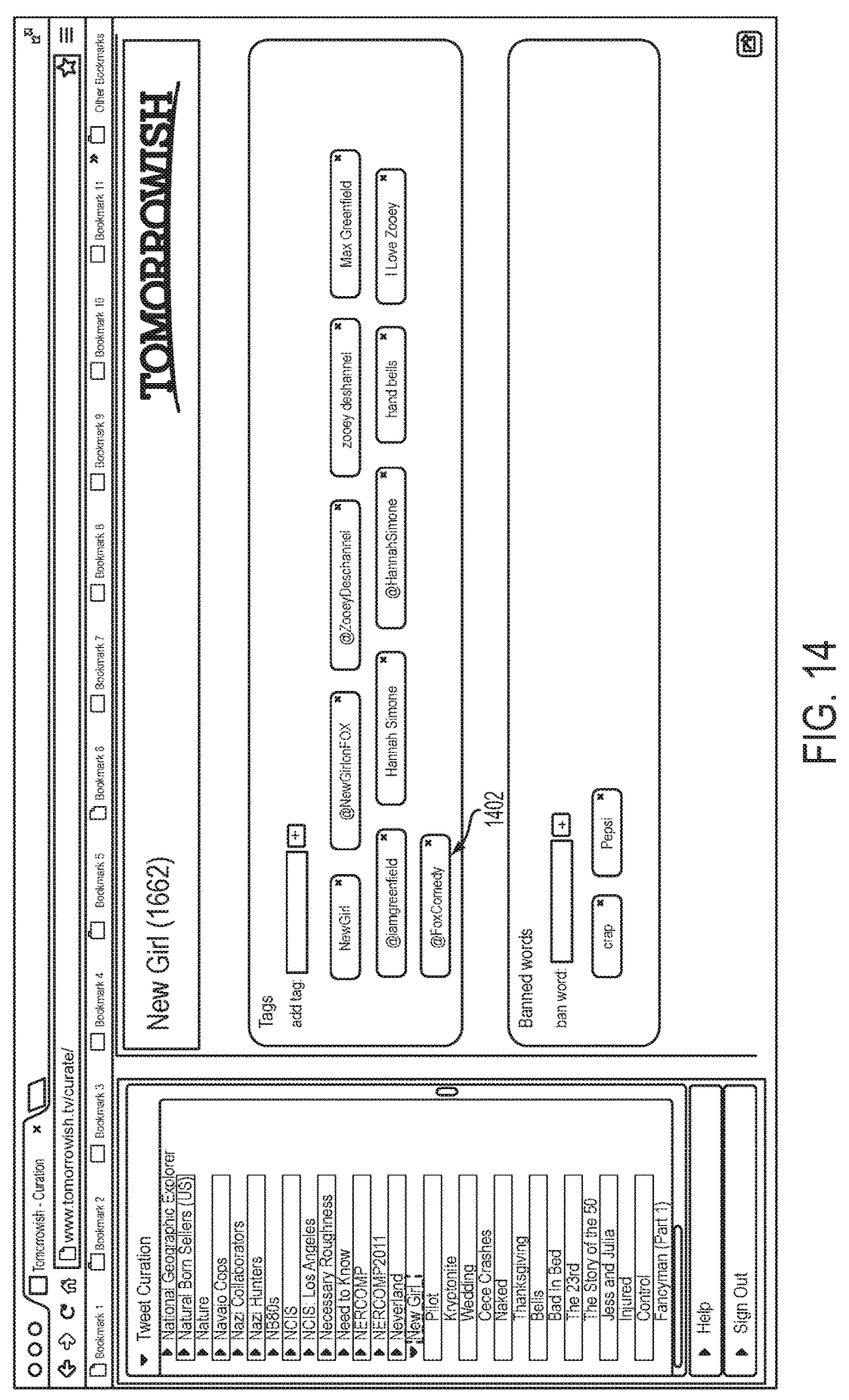

FIG. 14 shows another view of the user interface 1200. In this view, the newly added tag 1402 "@FoxComedy" has appeared in a tag list.

Figure 15:
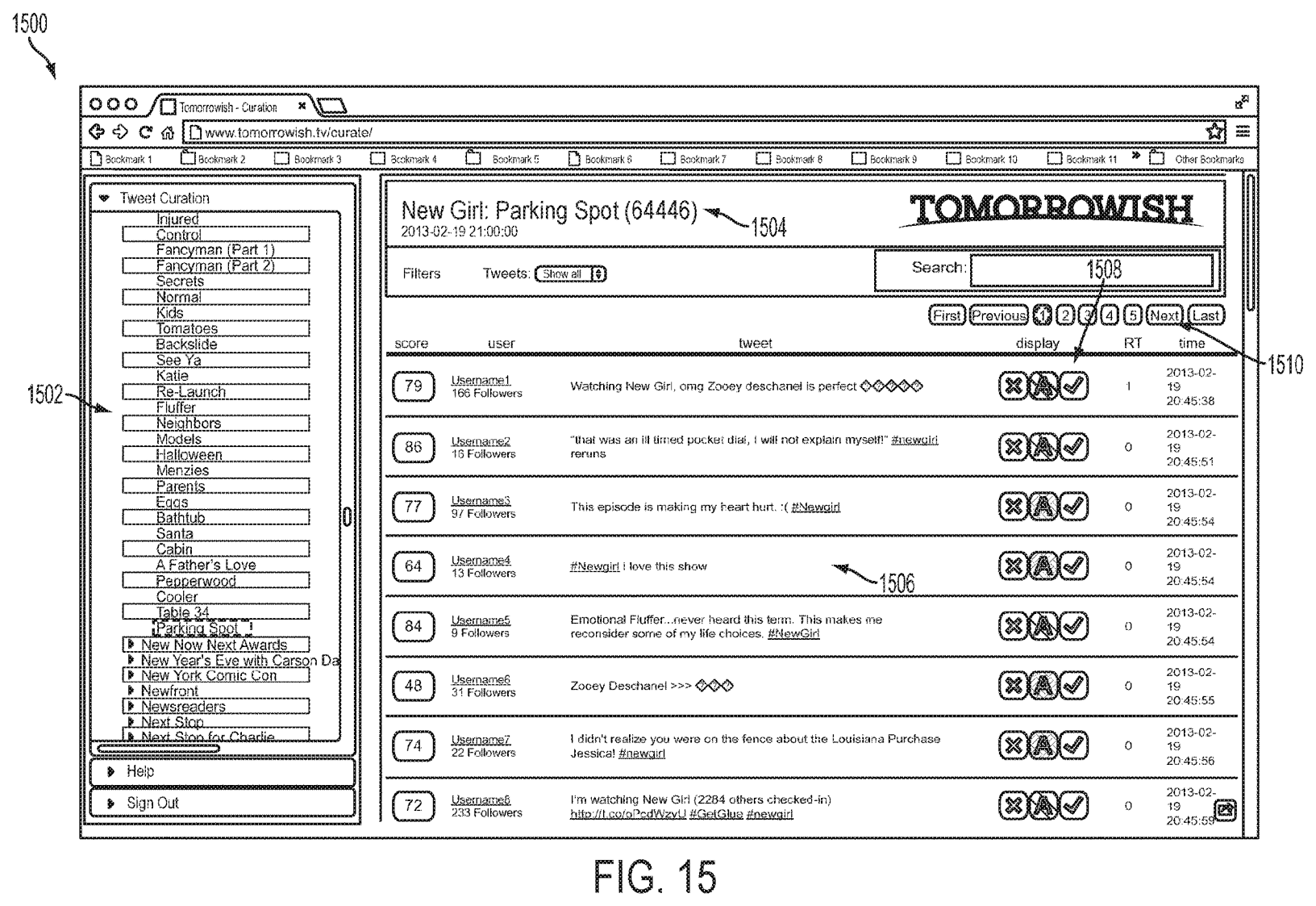

FIG. 15 shows an example user interface 1500 for accessing another functional area of a curation tool. An authorized user can use this interface 1500 to monitor and manipulate elements of social media content relevant to the media program. For example, a TV program producer can use a series and episode selection drop-down 1502 to select an episode of the TV program. Upon the selection, the user interface 1500 displays the name and program id of the selected episode in the program information area 1504. The user interface 1500 also displays social media content pertaining to the selected media program in a social media pane 1506. Information such as score, creator, tweet, display option, number of re-tweet, and creation time may be included. The display option column 1508 shows the current display setting for each social media element. The display setting may be "automatically accepted" or "automatically rejected," which indicate, respectively, the social media playback system 100 has automatically determined whether to show or hide a social media message, for example, based on keywords associated with the message, a user associated with the message, a relevance of the message, or other factors. For example, a relevance score can be calculated for the message based on keywords associated with the message, as explained above with respect to the relevance calculation module 203 in FIG. 2. Using the messages in FIG. 15 as an example, the messages containing variations of the keyword #newgirl can be assigned a relevance score indicating that those messages are relevant to the New Girl TV program because they are all variations of the name of the TV program. An authorized user can also manually accept or reject a social media message, thus overriding the automatic display setting for that message. When the number of social media messages pertaining to the media program exceeds one page, an authorized user can navigate the messages via a navigation mechanism such as navigation buttons 1510.

Figure 16:
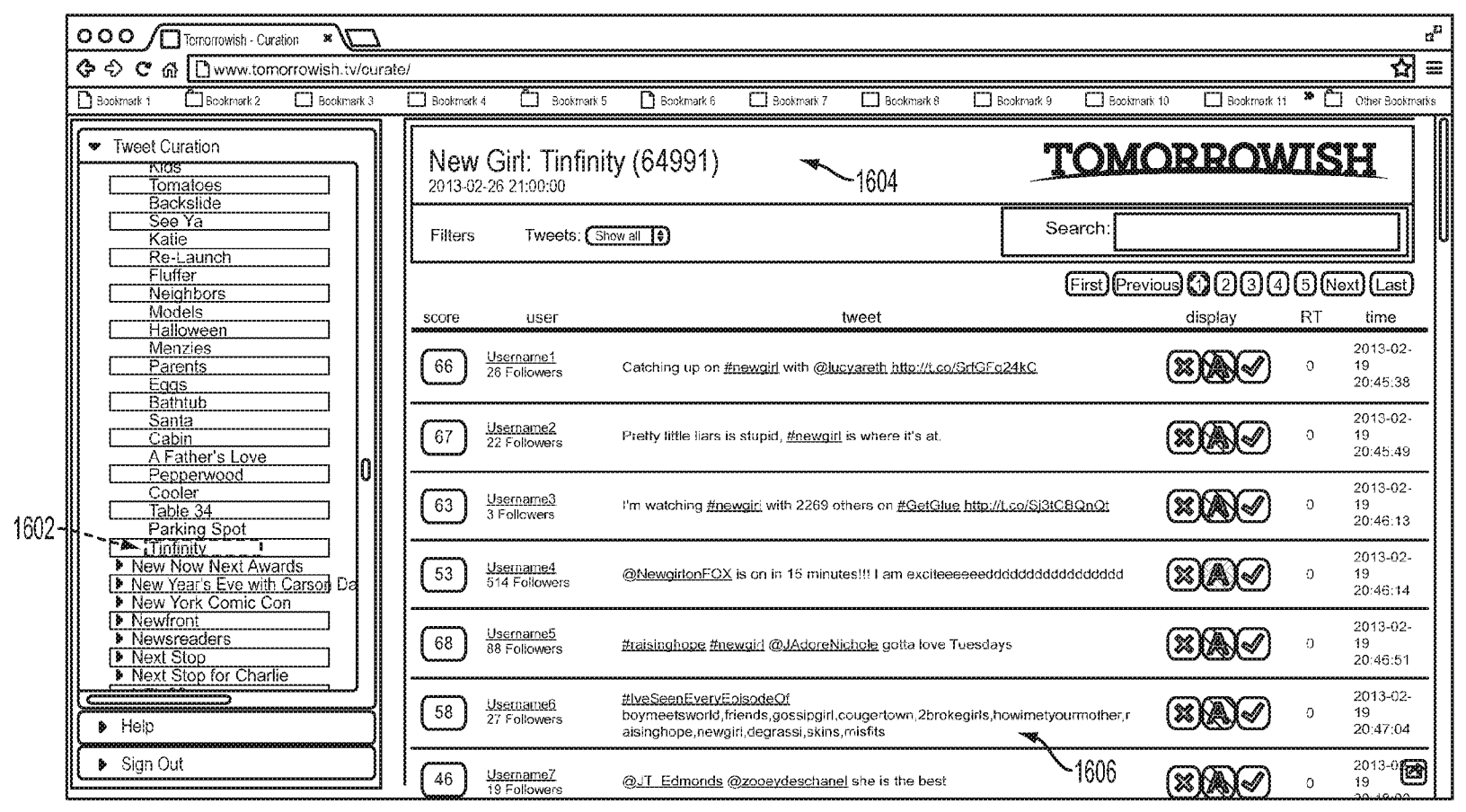

FIG. 16 shows another view of the user interface 1500. In this view, an authorized user has selected a different episode of the relevant media program from the series and episode selection drop-down 1602. As a result, the program information area 1604 now shows the newly selected media program. The social media pane 1606 is also updated with elements of social media content pertaining to the new episode.

Figure 17:
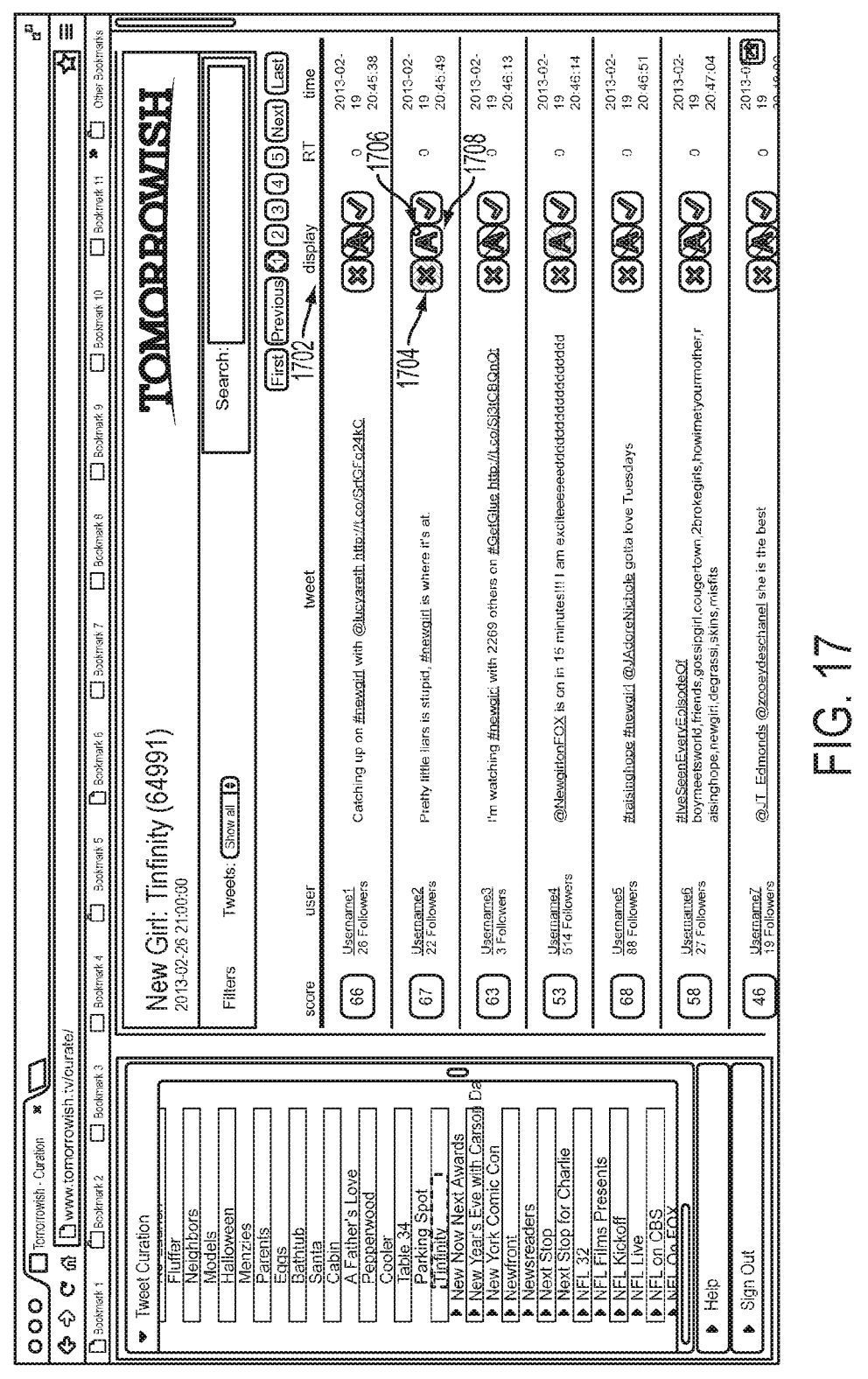
Figure 18:
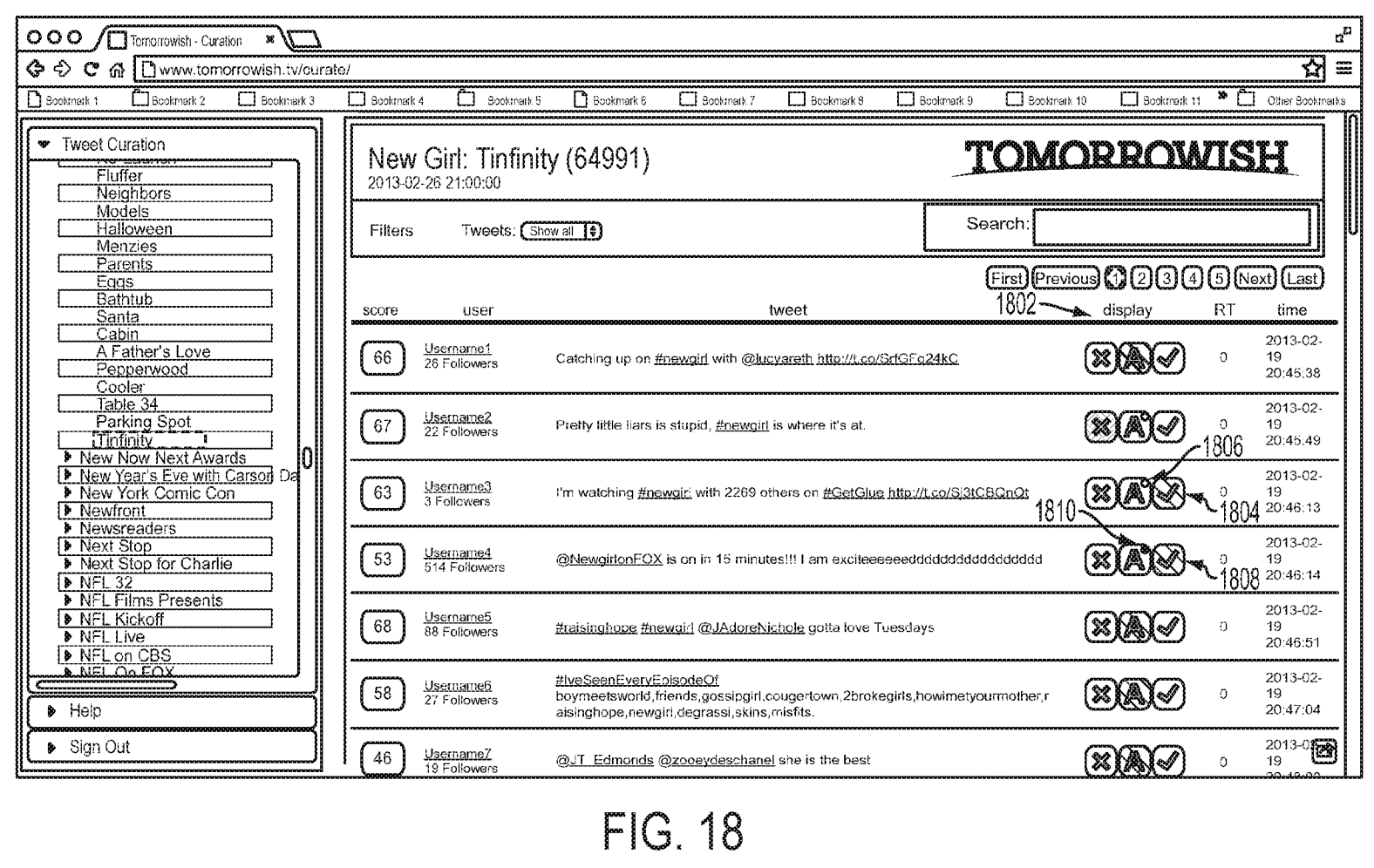

FIG. 17 shows another view of the user interface 1500. In this view, an authorized user has manually rejected a social media message (the second message from the top) that had an "automatically accepted" display setting. The display column 1702 shows a red "X" mark 1704 on the left indicating that the message is rejected; a small green check mark 1706 appears on the corner of the grayed-out letter "A" 1708 in the middle, reminding the user that the social media message had an "automatically accepted" setting that was overridden FIG. 18 shows another view of the user interface 1500. In this view, an authorized user has manually accepted two social media messages (the third and the fourth message from the top). For the third message, the display column 1802 shows a big green check mark 1804 on the right and a small green check mark 1806 on the corner of the grayed-out letter "A" in the middle. This indicates that the message had an "automatically accepted" setting and is also manually accepted. For the fourth message, the display column 1802 shows a big green check mark 1808 on the right and a small red "X" 1810 on the corner of the grayed-out letter "A" in the middle. This indicates that the message had an "automatically rejected" setting but is now manually accepted.

Figure 19:
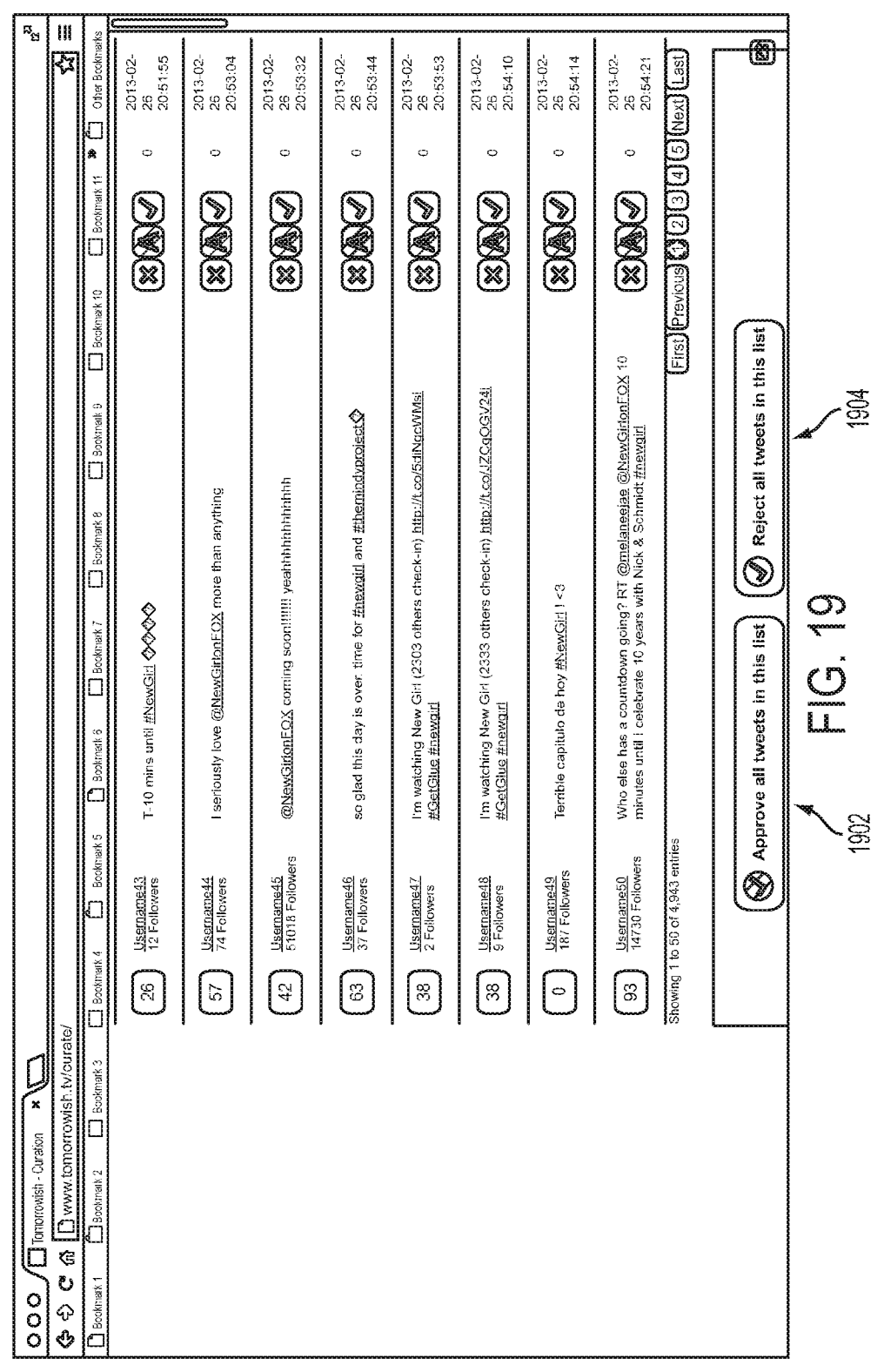

FIG. 19 shows another view of the user interface 1500. This view illustrates how an authorized user can accept or reject a whole page of social media content pertaining to a media program without having to navigate through each individual element. In this view, an authorized user has scrolled all the way down to the bottom of the screen. Two buttons are presented: an "Approve all tweets in the list" button 1902 and a "Reject all tweets in this list" button 1904. An authorized user can use the "Approve all" button 1902 to accept the entire page of social media content. Or, the user can use the "Reject all" button 1904 to prevent the entire page of social media content from being shown. In some examples, the social media playback system 100 (FIG. 1) can record information about approved and rejected content in a database, e.g., the database 300 shown in FIG. 3.

Figure 20:
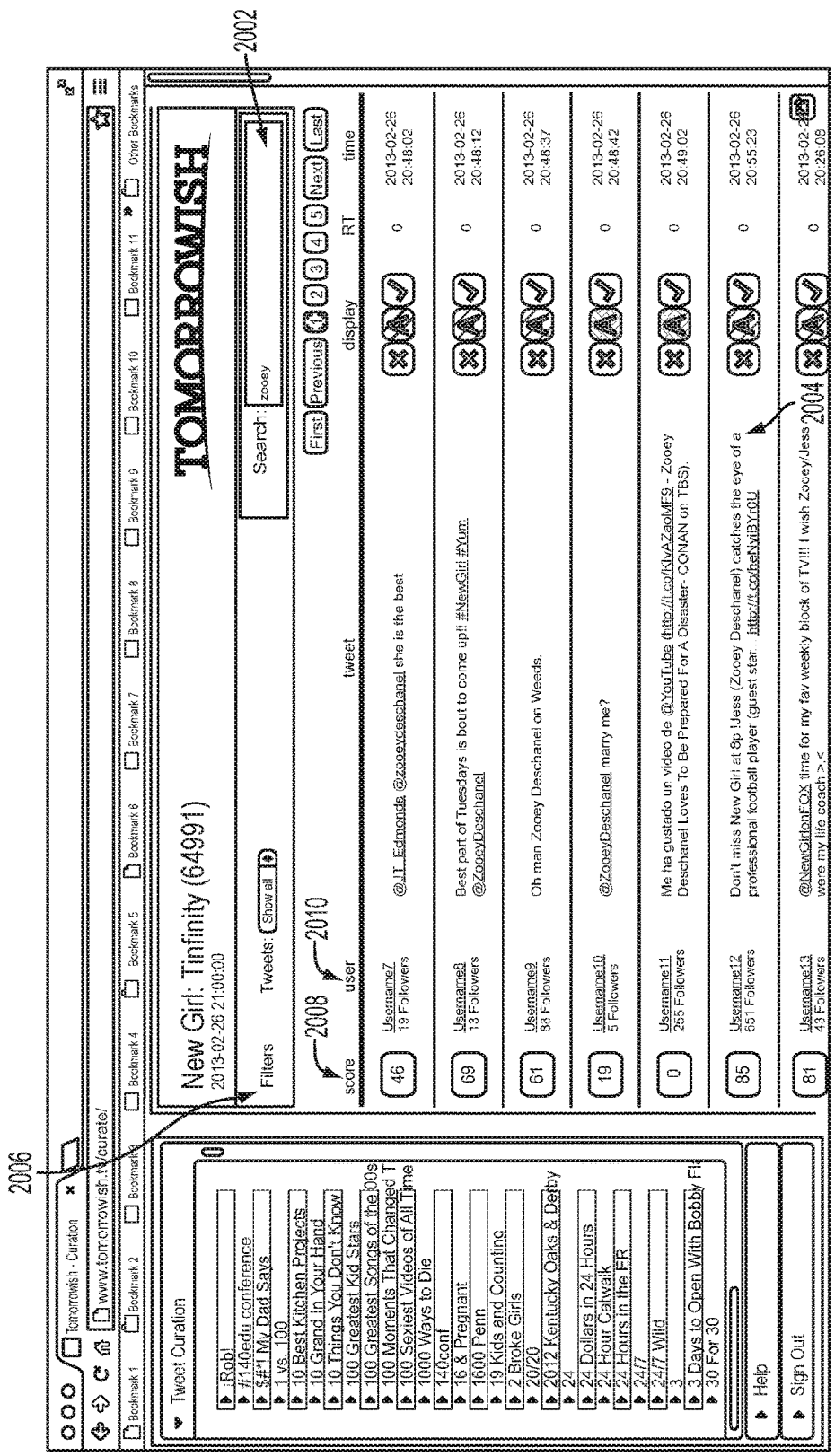

FIG. 20 shows another view of the user interface 1500. The view illustrates how an authorized user of the curation tool can search, filter, and sort social media content. In this view, an authorized user has entered a keyword, "zooey", in the search area 2002 to instruct the social media playback system 100 to retrieve social media content containing that keyword. As a result, the social media pane 2004 displays only elements of social media content that have the specified keyword. An authorized user can also search for specific social media content by applying a filter. In the example shown here, an authorized user has specified the "show all" option in the filter selection area 2006. This option imposes no limits to what the social media playback system 100 may return. The authorized user could also choose to only show those elements of social media content that are relevant to the entered keyword, "zooey." For example, a relevance score can be calculated for each element of social media content based on "zooey," as explained above with respect to the relevance calculation module 203 in FIG. 2. And only those elements of social media with a relevance score with respect to "zooey" above a particular value would be displayed. Once the search results are obtained, the authorized user can sort them based on particular field values. For example, the authorized user may click the "score" column header 2008 to sort the results by "score." Alternatively, the user may click the "user id" column 2010 to sort by user id.

Figure 21:
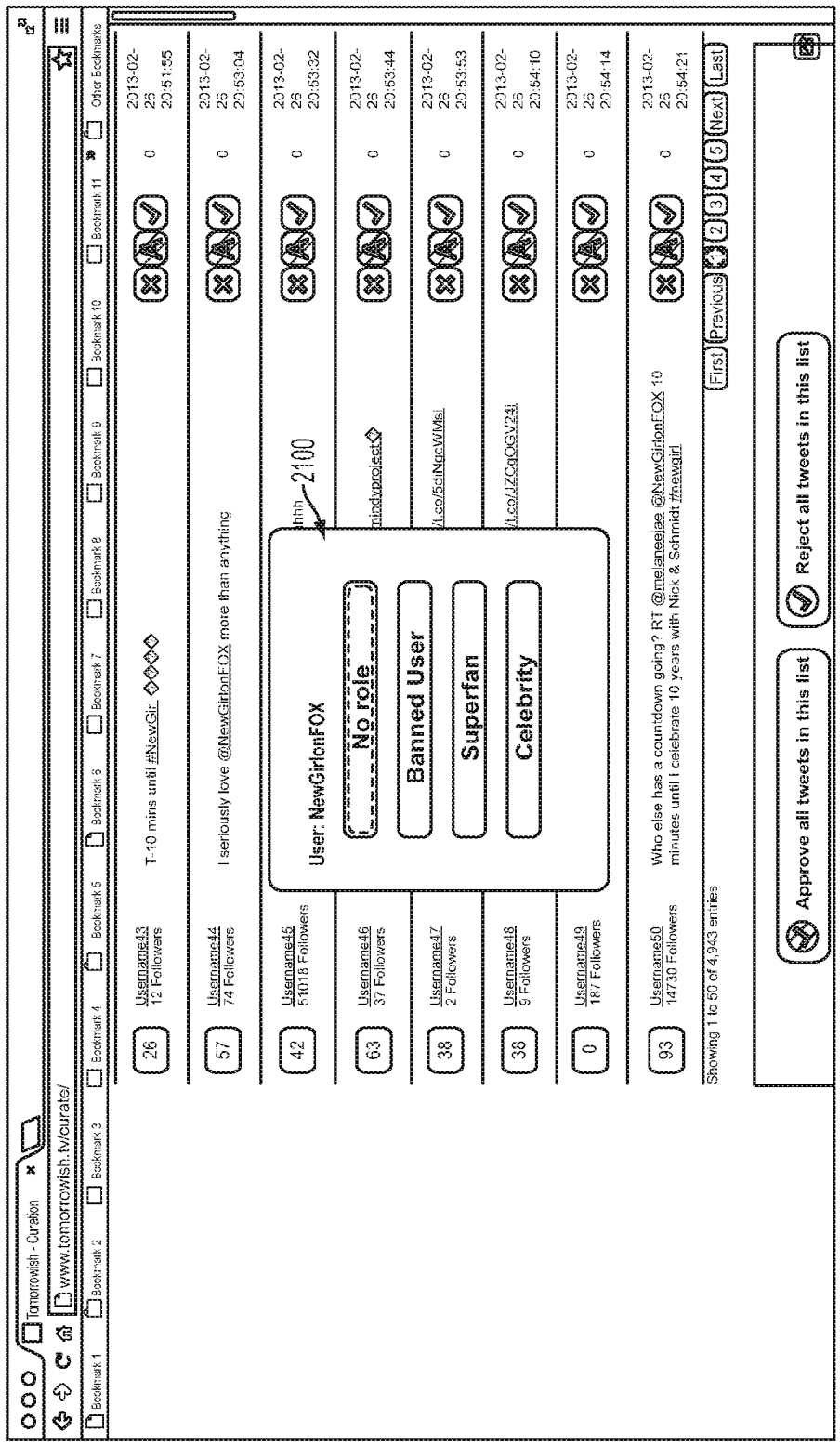

FIG. 21 illustrates how an authorized user of the user interface can utilize user roles to assign different priorities to the messages of social media participants. Having a higher priority ensures that a participant's social media messages are shown above those of a low-priority participant. In this example, an authorized user has selected a participant named NewGirlonFOX from the user interface 1500. The selection has brought up a pop-up box 2100, displaying four exemplary user roles: No role, Banned User, Superfan, and Celebrity. The "No role" option is the default option for all social media users in the present exemplary implementation. This option conveys no special priority. The "Banned User" role, when applied, prevents a social media participant's messages from being seen by other participants. The "Superfan" role gives a participant's social media messages higher priority than those of a "No role" user. For example, the social media playback system 100 can choose a social media message of a "Superfan" user to display instead of a social media message of a "No Role" user, for example, if the social media playback system 100 is choosing between two messages to display at a time at which only one can be displayed. The "Celebrity" role is reserved for those participants who are associated with the relevant media program. For instance, an actor who plays a role in the media program can have a "Celebrity" role. A "Celebrity" participant's social media entries may have the highest priority and may be shown in place non-celebrity participants' entries (e.g., if the social media playback system 100 chooses one entry among two entries that could be shown at a particular time). In some examples, a social media message posted by a user in the "Celebrity" role may be highlighted or otherwise indicated when the social media message is displayed in a stream of social media content associated with the media program. In the example here, the pop-up box 2100 shows that NewGirlonFOX has been given the default role of "No role."

Figure 22:
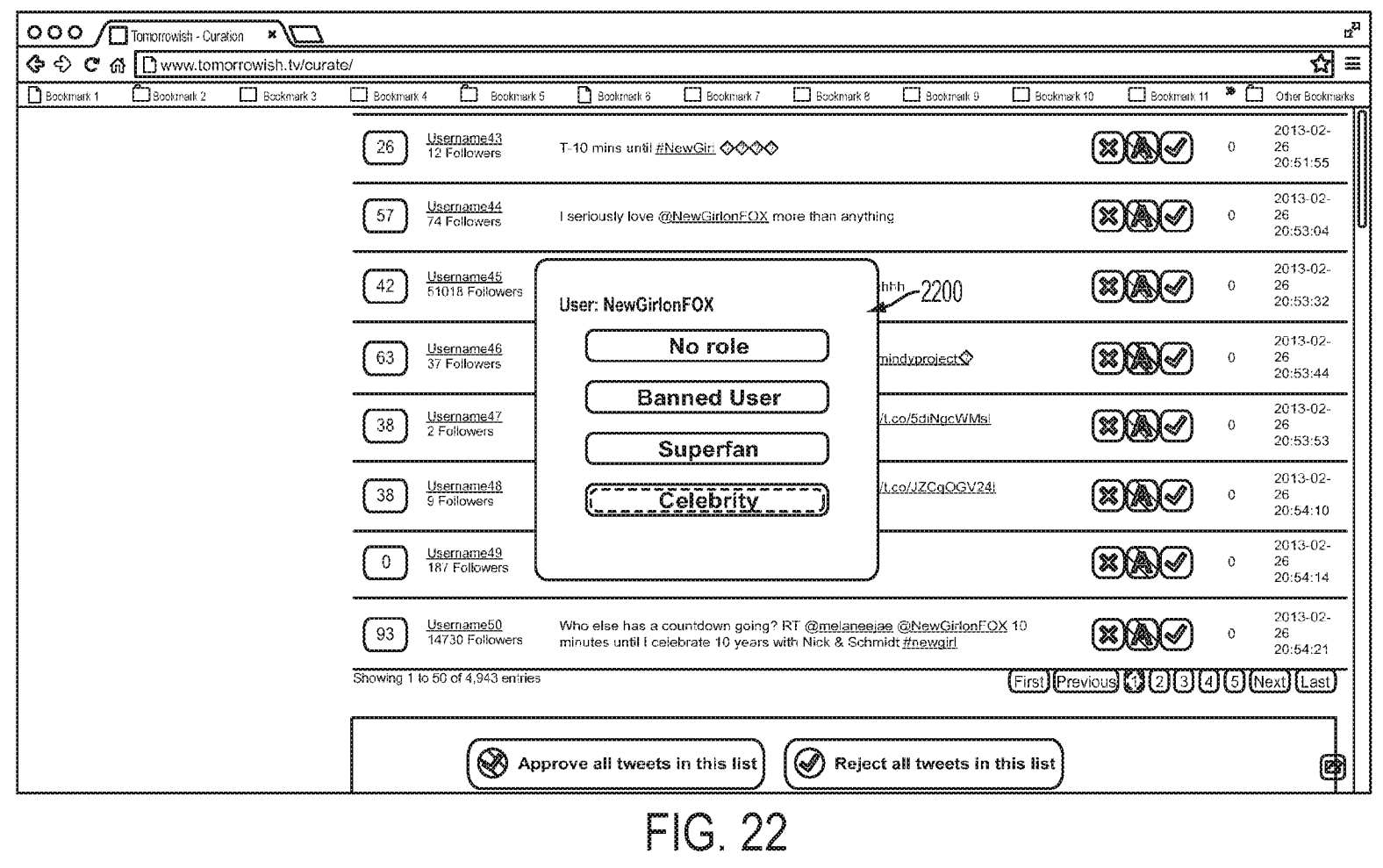

FIG. 22 shows another view of the pop-up box 2100. Here, NewGirlonFOX's role has been changed to "Celebrity" in the pop-up box 2200.

Figure 23:
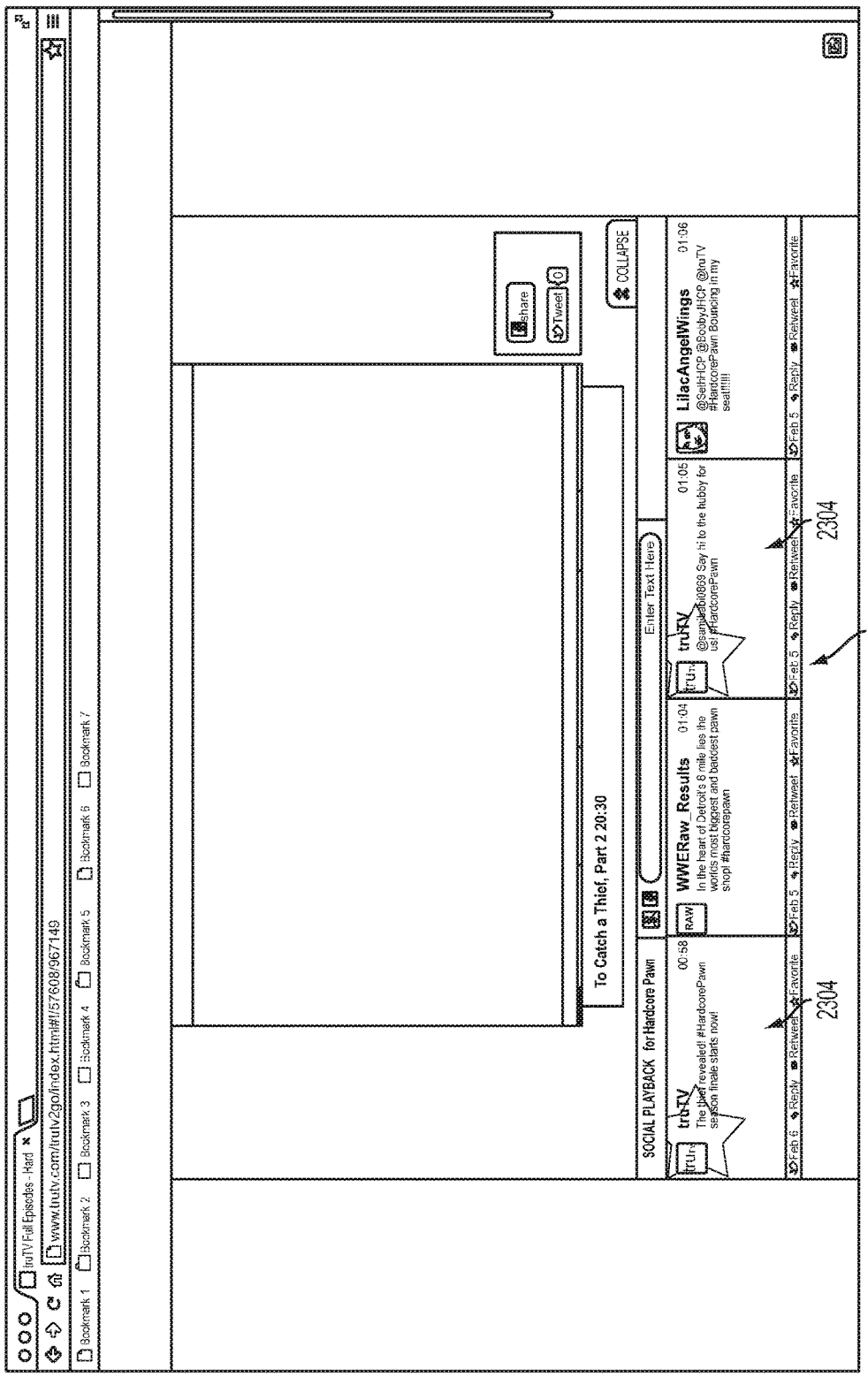

FIG. 23 illustrates the effect of use roles on the display of social media messages. The social media pane 2302 shows two messages 2304 created by users of "Celebrity" role. Because of the high priority assigned to Celebrity users, the two messages 2304 stick to the left hand side as the social media stream moves right to left, until the next "Celebrity" message pushes the previous one off the social media pane 2302. For example, the messages 2304 may have been identified as exceptional messages 318 (FIG. 3) by the social media playback system 100.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Other implementations are within the scope of the following claims.

The invention claimed is:
1. A computer-implemented method comprising
at a social media playback system comprising one or more computer processors and in communication with a data communications network:

receiving data representing social media content from at least one social media service in communication with the data communications network, the social media content comprising elements of social media;

receiving, from a media provider in communication with the data communications network, schedule data pertaining to a first media program;

calculating, based at least in part on the schedule data, a relevance score for a first keyword identified in the social media content, the relevance score indicative of the relevance of the first keyword to the first media program;

determining that the relevance score calculated for the first keyword satisfies a relevance score threshold;

storing data associating the first keyword and the first media program;

determining that the first keyword appears in a first element of the received social media content, the first element of the received social media content having been posted during a playback of the first media program and during a playback of a second media program;

determining that the first keyword appears in a second element of the received social media content, the second element of the received social media content having been posted during a playback of the first media program and not during a playback of the second media program;

calculating, based at least in part on information related to the first media program, a first relevance score for the first keyword that satisfies the relevance score threshold; and calculating, based at least in part on information related to the second media program, a second relevance score for the first keyword that does not satisfy the relevance score threshold.

2. The method of claim 1, wherein
the schedule data indicates a schedule of transmissions of the first media program, and
determining that the relevance score calculated for the first keyword satisfies a relevance score threshold comprises determining that the first keyword appears in social media content posted during transmissions of the first media program at a frequency that satisfies a first frequency threshold, and that the first keyword does not appear in social media content posted at times other than transmissions of the first media program at a frequency that satisfies the first frequency threshold.

3. The method of claim 1, comprising comparing a timestamp of the social media content to the schedule data pertaining to the first media program and determining that the social media content was posted during a scheduled playback of the first media program.

4. The method of claim 1, wherein calculating the relevance score for the first keyword comprises
identifying, in an element of the social media content, a second keyword already associated with the first media program, and
determining that the first keyword is relevant to the first media program based at least in part on the presence of the second keyword in the element of the social media content.

5. The method of claim 4, wherein the second keyword comprises a portion of the first keyword.

6. The method of claim 1, comprising
receiving additional social media content different from the social media content from the at least one social media service in communication with the data communications network;
identifying, in an element of the additional social media content different from the social media content, a second keyword;
calculating, based at least in part on the schedule data, a relevance score for the second keyword identified in the additional social media content, the relevance score indicative of the relevance of the second keyword to the first media program;
determining that the relevance score calculated for the second keyword satisfies a relevance score threshold;
storing data associating the second keyword and the first media program; and
updating, based at least in part on comparing the relevance score for the first keyword and the relevance score of the second keyword, the data associating the first keyword and the first media program.

7. The method of claim 1, comprising
determining that the first keyword appears in a third first element of the received social media content, the third element of the received social media content having been posted during a playback of the first media program and during a playback of a third media program;
determining that the first keyword appears in a fourth element of the received social media content, the fourth element of the received social media content having been posted during a playback of the third media program;
calculating, based at least in part on information related to the first media program, a third relevance score for the first keyword that satisfies the relevance score threshold;
calculating, based at least in part on information related to the third media program, a fourth relevance score for the first keyword that satisfies the relevance score threshold; and
removing, upon determining that a difference between the third first relevance score and the fourth relevance score is less than a predetermined threshold, the data associating the first keyword and the first media program.

8. The method of claim 1, comprising
receiving, from the media provider, attribute data pertaining to the first media program;
automatically identifying at least one second keyword appearing in the attribute data; and
storing data associating the at least one second keyword and the first media program.

9. The method of claim 1, wherein the data associating the first keyword and the first media program identifies a ranking of the first keyword relative to one or more keywords different from the first keyword associated with the first media program.

10. The method of claim 9, comprising
receiving additional social media content different from the social media content from the at least one social media service;
identifying, in an element of the additional social media content different from the social media content, a second keyword;
calculating, based at least in part on the schedule data, a relevance score for the second keyword identified in the additional social media content, the relevance score indicative of the relevance of the second keyword to the first media program;

determining that the relevance score calculated for the second keyword satisfies a relevance score threshold;

storing data associating the second keyword and the first media program; and updating, based at least in part on comparing the relevance score for the first keyword and the relevance score of the second keyword, the ranking of the first keyword relative to the one or more keywords different from the first keyword associated with the first media program.

11. A computer-implemented method comprising at a social media playback system comprising one or more computer processors and in communication with a data communications network:

receiving data representing social media content from at least one social media service in communication with the data communications network, the social media content comprising elements of social media;

receiving, from one or more media providers in communication with the data communications network, first schedule data pertaining to a first media program and second schedule data pertaining to a second media program;

determining that a first keyword appears in a first element of the received social media content, the first element of the received social media content having been posted during a playback of the first media program and during a playback of the second media program;

determining that the first keyword appears in a second element of the received social media content, the second element of the received social media content having been posted during a playback of the first media program and not during a playback of the second media program;

calculating, based at least in part on the schedule data pertaining to the first media program and on information related to the first media program, a first relevance score for the first keyword identified in the social media content, the first relevance score indicative of the relevance of the first keyword to the first media program;

calculating, based at least in part on the schedule data pertaining to the second media program and on information related to the second media program, a second relevance score for the first keyword;

determining that the first relevance score calculated for the first keyword satisfies a relevance score threshold;

determining that the second relevance score calculated for the first keyword does not satisfy the relevance score threshold; and storing data associating the first keyword and the first media program.

12. The method of claim 11, wherein the one or more media providers in communication with the data communications network are two different media providers.

13. The method of claim 11, wherein the one or more media providers in communication with the data communications network are the same media provider.

14. The method of claim 11, comprising removing, upon determining that the second relevance score calculated for the first keyword does not satisfy the relevance score threshold, data associating the first keyword and the second media program.

15. The method of claim 11, comprising removing, upon determining that a difference between the first relevance score and the second relevance score is less than a predetermined threshold amount, the data associating the first keyword and the first media program.

16. The method of claim 11, comprising determining that the second relevance score calculated for the first keyword satisfies the relevance score threshold;

removing, upon determining that the second relevance score is larger than the first relevance score, the data associating the first keyword and the first media program; and storing data associating the first keyword and the second media program.

17. At least one non-transitory computer-readable storage medium encoded with executable instructions that, when executed by at least one processor, cause the at least one processor to perform operations comprising receiving, at a social media playback system comprising the at least one processor and in communication with a data communications network, social media content from at least one social media service in communication with the data communications network, the social media content comprising elements of social media;

receiving, from one or more media providers in communication with the data communications network and at the social media playback system, schedule data pertaining to a first media program;

calculating, by the social media playback system and based at least in part on the schedule data, a relevance score for a first keyword identified in the social media content, the relevance score indicative of the relevance of the first keyword to the first media program;

determining, by the social media playback system, that the relevance score calculated for the first keyword satisfies a relevance score threshold;

storing, at the social media playback system, data associating the first keyword and the first media program;

receiving, from the one or more media providers in communication with the data communications network, second schedule data pertaining to a second media program;

determining that the first keyword appears in a first element of the received social media content, the first element of the received social media content having been posted during a playback of the first media program and during a playback of the second media program;

determining that the first keyword appears in a second element of the received social media content, the second element of the received social media content having been posted during a playback of the first media program and not during a playback of the second media program;

calculating, based at least in part on the schedule data pertaining to the second media program and on information related to the second media program, a second relevance score for the first keyword; and removing, upon determining that a difference between the relevance score and the second relevance score is less than a predetermined threshold amount, the data associating the first keyword and the first media program.

18. The computer-readable storage medium of claim 17, the operations comprising determining, by the social media playback system, that the first keyword appears in a third element of the received social media content, the third element of the received social media content having been posted during a playback of the first media program and during a playback of a third media program;

determining, by the social media playback system, that the first keyword appears in a fourth element of the received social media content, the fourth element of the received social media content having been posted during a playback of the first media program and not during a playback of the third media program;

calculating, by the social media playback system and based at least in part on information related to the first media program, a third relevance score for the first keyword that satisfies the relevance score threshold; and calculating, by the social media playback system and based at least in part on information related to the third media program, a fourth relevance score for the first keyword that does not satisfy the relevance score threshold.

19. The computer-readable storage medium of claim 17, wherein calculating the relevance score for the first keyword comprises identifying, in an element of the social media content, a second keyword already associated with the first media program, and determining that the first keyword is relevant to the first media program based at least in part on the presence of the second keyword in the element of the social media content.

\* \* \* \* \*

UNITED STATES PATENT AND TRADEMARK OFFICE
CERTIFICATE OF CORRECTION

PATENT NO. : 10,528,573 B1
APPLICATION NO. : 15/099135
DATED : January 7, 2020
INVENTOR(S) : Richard Michael Darling et al.

It is certified that error appears in the above-identified patent and that said Letters Patent is hereby corrected as shown below:

In the Claims

Column 28, Line 23, Claim 7, after "third" delete "first".

Column 28, Line 43, Claim 7, after "third" delete "first".

Signed and Sealed this
Fourth Day of August, 2020

Andrei Iancu
*Director of the United States Patent and Trademark Office*